Figure 1:
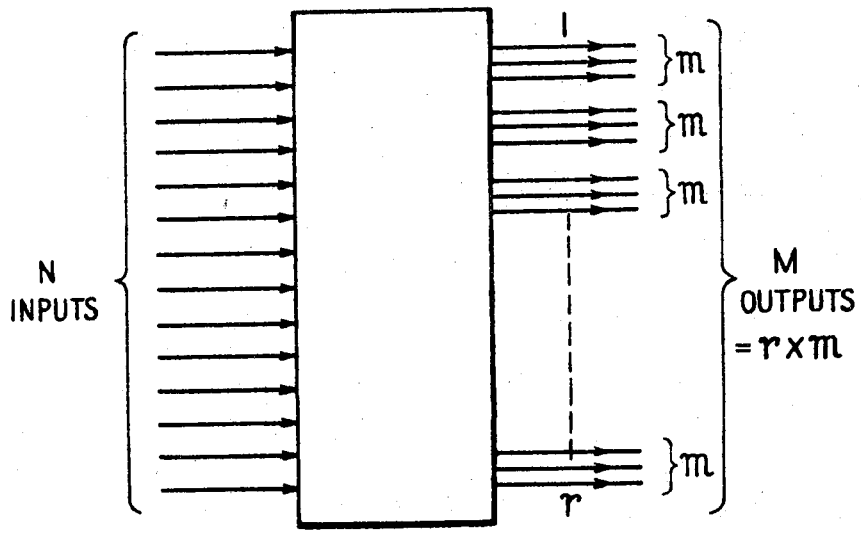

June 25, 1968 J. A. LAWRENCE 3,390,236
TELECOMMUNICATION SYSTEMS HAVING PRIMARY AND
SECONDARY RANKS OF MATRICES
Filed July 26, 1965 51 Sheets-Sheet 1

JOHN A. LAWRENCE,
INVENTOR

BY Hall & Houghton

ATTORNEY

John A. Lawrence,
INVENTOR

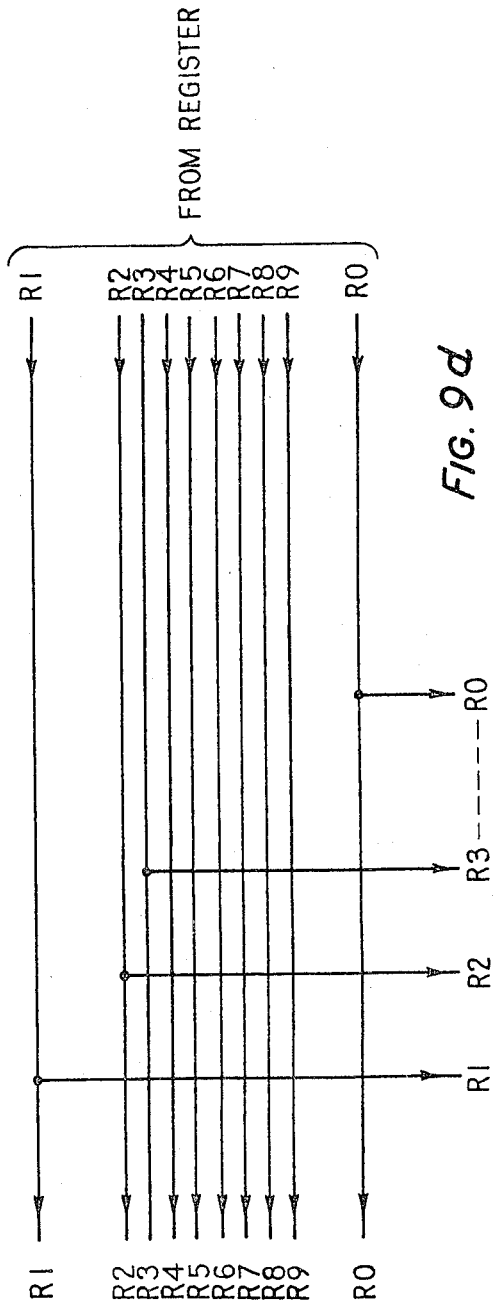

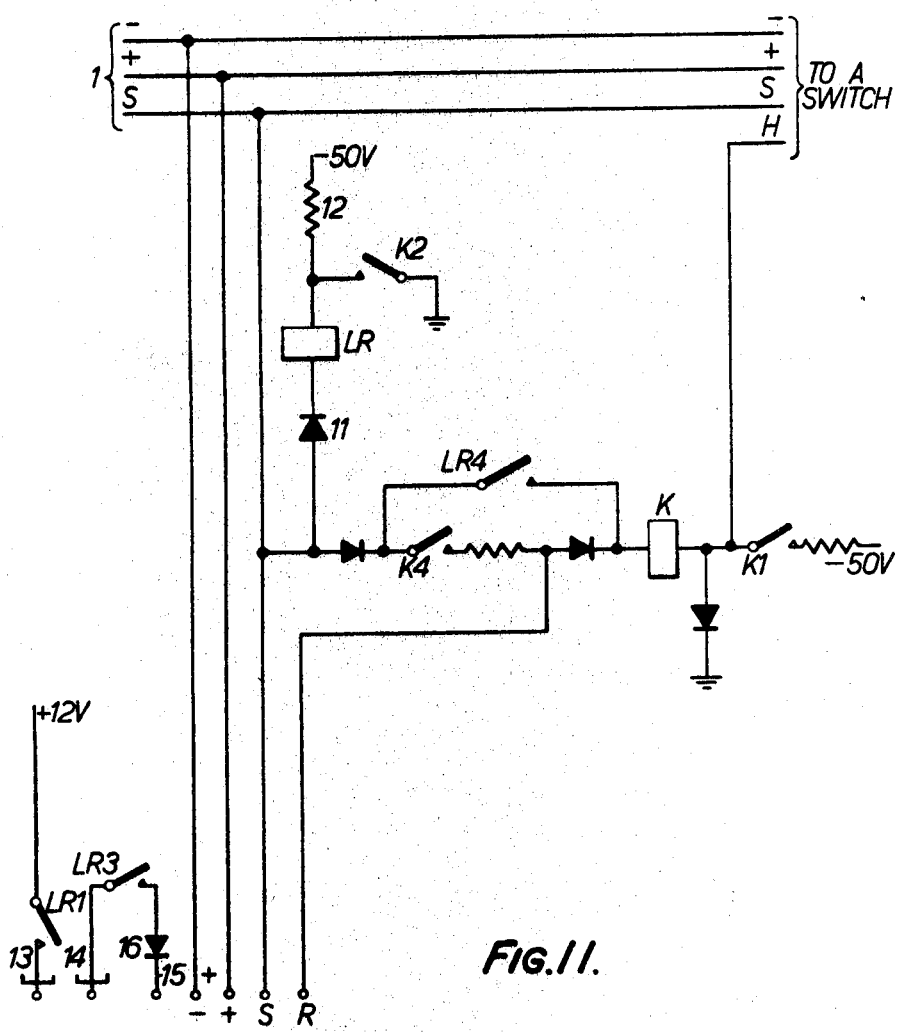

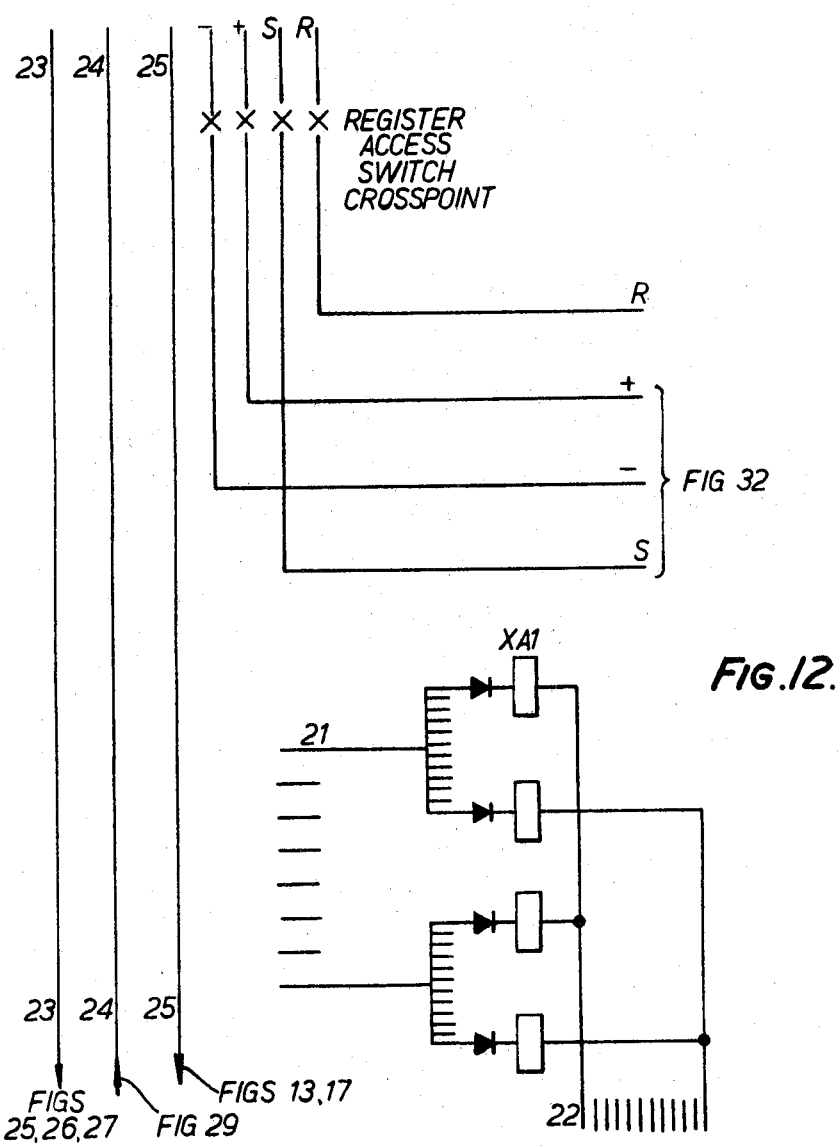

June 25, 1968　　　J. A. LAWRENCE　　　3,390,236
TELECOMMUNICATION SYSTEMS HAVING PRIMARY AND
SECONDARY RANKS OF MATRICES
Filed July 26, 1965　　　　　　　　　　　51 Sheets-Sheet 19

INVENTOR
John A. Lawrence
BY
ATTORNEY

June 25, 1968  J. A. LAWRENCE  3,390,236
TELECOMMUNICATION SYSTEMS HAVING PRIMARY AND
SECONDARY RANKS OF MATRICES
Filed July 26, 1965  51 Sheets-Sheet 22

JOHN A. LAWRENCE
INVENTOR

BY Hall + Houghton

ATTORNEY

John A. Lawrence,
INVENTOR

ATTORNEY

John A. Lawrence,
INVENTOR

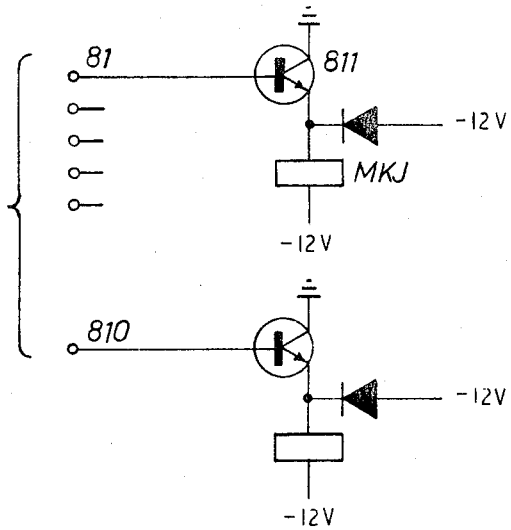
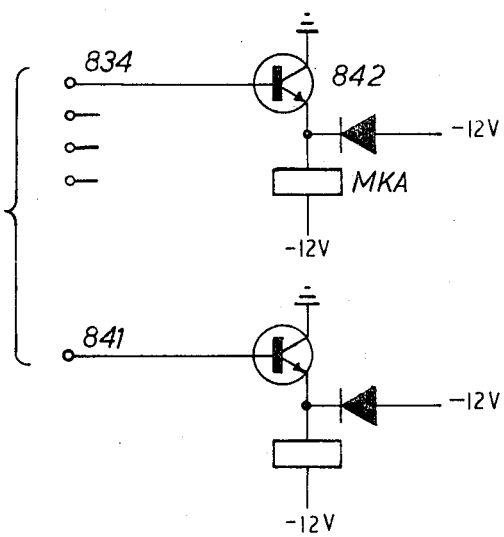
FIG. 42.

June 25, 1968

J. A. LAWRENCE 3,390,236

TELECOMMUNICATION SYSTEMS HAVING PRIMARY AND
SECONDARY RANKS OF MATRICES

Filed July 26, 1965

51 Sheets-Sheet 45

John A. Lawrence,
Inventor

By Hall & Houghton
Attorney

June 25, 1968 J. A. LAWRENCE 3,390,236
TELECOMMUNICATION SYSTEMS HAVING PRIMARY AND
SECONDARY RANKS OF MATRICES
Filed July 26, 1965 51 Sheets-Sheet 46
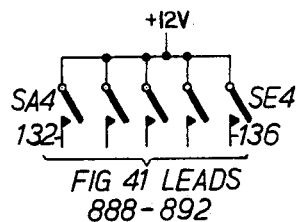
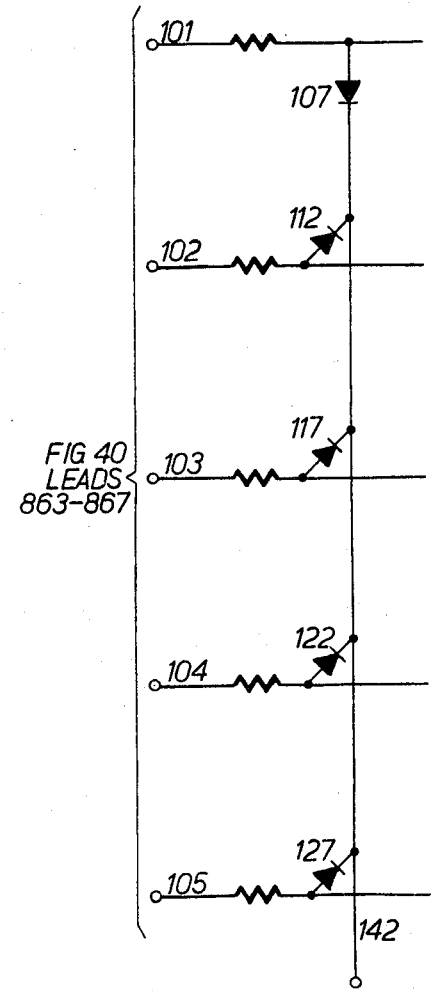
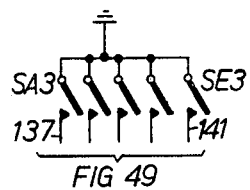
FIG. 46.
John A. Lawrence,
Inventor June 25, 1968  J. A. LAWRENCE  3,390,236
TELECOMMUNICATION SYSTEMS HAVING PRIMARY AND
SECONDARY RANKS OF MATRICES
Filed July 26, 1965  51 Sheets-Sheet 48

INVENTOR
JOHN A. LAWRENCE,
BY
ATTORNEY

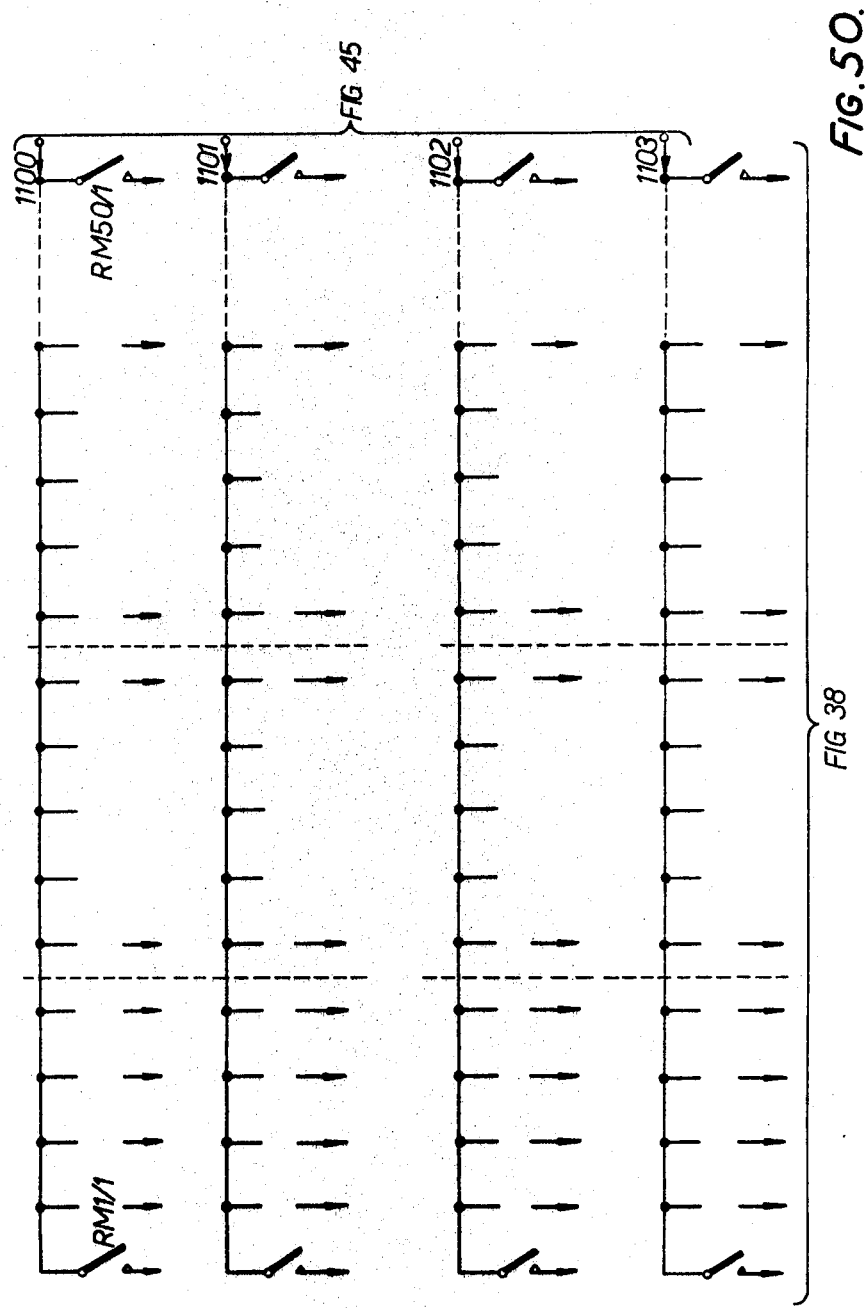

FIG. 51

3,390,236
TELECOMMUNICATION SYSTEMS HAVING PRIMARY AND SECONDARY RANKS OF MATRICES

John Albert Lawrence, Beckenham, Kent, England, assignor to Her Majesty's Postmaster General, London, England
Filed July 26, 1965, Ser. No. 474,725
Claims priority, application Great Britain, July 31, 1964, 30,349/64
15 Claims. (Cl. 179—18)

This invention relates to a switching stage for automatic telecommunication exchange systems, operating on the well known space division technique and particularly on step-by-step principles.

A known arrangement operating on this basis is the Strowger step-by-step system, a description of which can be found particularly in "Telephony," Volume 2, by J. Atkinson, and also in "Automatic Telephony" by C. W. Wilman and in "Introduction to Congestion Theory in Telephone Systems" by R. Syski.

In the trunking of the known Strowger system, two-motion mechanical switches are used for making connection at each stage, each switch, except that in the final stage, being operated by a single dialled decimal digit in the form of a train of pulses, and each switch incorporating its own control means for selecting one of a number of possible routes in accordance with the dialled digit. Setting-up of a connection progresses stage-by-stage as each switch makes a selection.

The object of this invention is to reproduce the flexibility of the Strowger step-by-step system without having the disadvantage of mechanical switches, and to decrease the time taken to select and make connection through a switching stage.

According to the invention, each switching stage comprises primary and secondary ranks of matrices of cross-point connections, each communication path through a stage being switched in accordance with information received and stored in register means unique to the stage and being under the control of a means associated with the stage.

In the accompanying drawings:

FIG. 1 shows N input circuits that can originate traffic to M outputs, consisting of $r$ groups of $m$ outputs per group. This is known as a "full availability" group, because all of the N inputs have access to all of the M outputs.

This corresponds in a Strowger system to—

Figure 2:
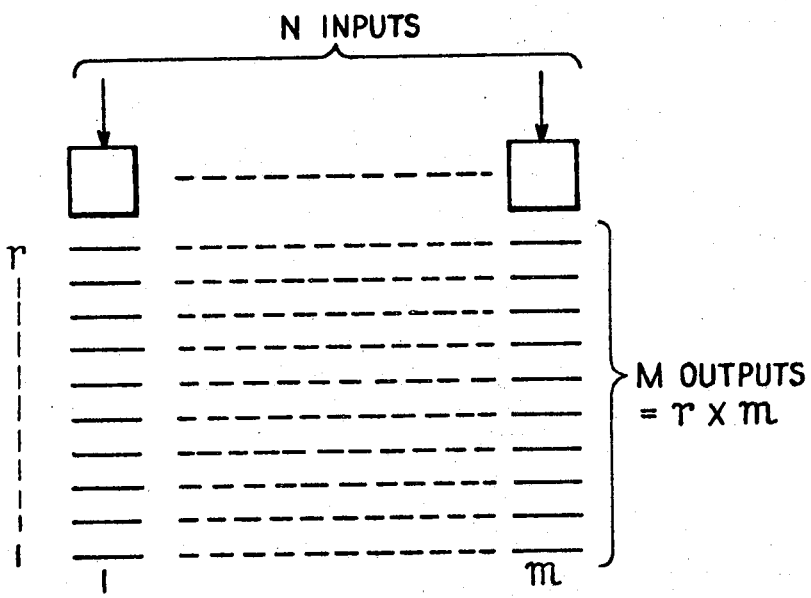

FIG. 2, in which N is a number of Strowger switches, the banks of which are multipled, so that the N sources of traffic can be distributed to M outputs, where $M = rm$, and $r = 10$ levels and $m = 20$ outputs per level.

This Strowger arrangement could be replaced by a single "full availability" cross-point matrix switch composed, for example, of the so-called reed relays, and requiring very simple means of control, but such a switch is not practical for economic reasons, and so—

Figure 3:
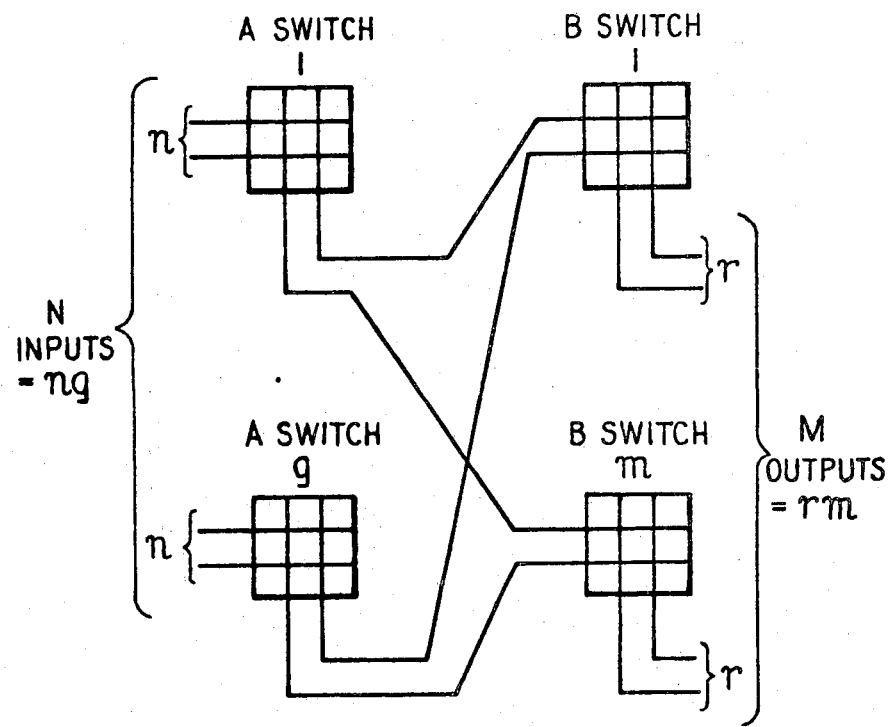

FIG. 3 shows a modified arrangement according to the invention.

N inputs have access to M outputs via a connecting stage composed of cross-point switch matrices A1–A$g$ for example, matrices of the so-called reed relays, serving the N inputs, and B1–B$m$ serving the M outputs. The N inputs are divided into $g$ groups of $n$ inputs each, each group serving as the inputs to a different A switch. The N outputs are divided in to $r$ groups of $m$ outputs each.

Every A switch is connected to every B switch, so that every input has access to every output.

When a switching stage is carrying traffic, it is possible, according to conditions, that internal blocking may occur, i.e. that a given input is unable to be connected to an output in a specified group, but this is acceptable, provided the arrangement is such that it complies with the conditions of lost traffic normally specified.

Thus, on a particular A switch the condition could arise when $(n-1)$ out of $(n)$ inputs might be busy when a demand is received on the $n$th input. In that case the $n$th input would have access to only $m-(n-1)=(m-n+1)$ out of $m$ AB links. When this condition arises the probability that the $n$th input will be unable to find a free output in a specified group of $(m-n+1)$ outputs needs to be made small enough to satisfy system requirements in respect of the blocking factor, e.g. Grade of Service of say, for example, 0.02 or 0.005, depending upon application. If $m$ is greater than $n$ the $(m-n+1)$ available links cannot be in use. Blockage therefore depends only in the state of the outputs in the designated output group. If the outputs are independent of each other and have a mean occupancy $b$ the requirements will be satisfied if $b^{(m-n+1)}$ is made less than or equal to the desired blocking factor. This assumption is an approximation; it serves in the present context to simplify calculation.

Given $b^x$ = blocking factor, the value of $n$ is given by $n = (m+1-x)$ where $x$ is the power to which $b$ must be raised to equal the blocking factor. Table 1 gives typical results for blocking factors of 0.05 and 0.02. In each entry, the value given for $n$ is the nearest integer that does not cause the desired blocking factor to be exceeded.

In Table 1, values for $m$, $b$ and blocking factor are specified, $m$ being the number of outputs in each output group and is the same as the number of AB link outputs from each A switch, and may be termed the availability, while $b$ is the mean traffic capacity of the $m$ outputs at a specified blocking factor (i.e. Grade of Service).

TABLE 1

| (m) | Blocking .005 | | Blocking .02 | |
|---|---|---|---|---|
| | Mean Traffic (b) | (n) | Mean Traffic (b) | (n) |
| 6 | .268 | 2 | .368 | 3 |
| 8 | .338 | 4 | .450 | 4 |
| 10 | .390 | 5 | .510 | 5 |
| 12 | .435 | 6 | .550 | 6 |
| 14 | .470 | 8 | .585 | 7 |
| 16 | .500 | 9 | .610 | 9 |
| 18 | .530 | 10 | .630 | 10 |
| 20 | .550 | 12 | .655 | 11 |
| 22 | .570 | 13 | .675 | 13 |
| 24 | .590 | 14 | .690 | 14 |
| 26 | .600 | 16 | .705 | 16 |
| 28 | .620 | 17 | .715 | 17 |
| 30 | .635 | 19 | .730 | 18 |

The cross-points required are:

Total cross-points for N inputs = $A$ switches + $B$ switches
$$= ngm + mgr$$

Cross-points per input where $N = ng = m + \dfrac{mr}{n}$
$$= m\left(1 + \dfrac{r}{n}\right)$$

Table 2 shows cross-points per input for $r = 10$.

TABLE 2

| m | Blocking .005 | | Blocking .02 | |
|---|---|---|---|---|
| | n | Xpts/N | n | Xpts/N |
| 6 | 2 | 26.0 | 3 | 26.0 |
| 8 | 4 | 28.0 | 4 | 28.0 |
| 10 | 5 | 30.0 | 5 | 30.0 |
| 12 | 6 | 32.0 | 6 | 32.0 |
| 14 | 8 | 31.5 | 7 | 34.0 |
| 16 | 9 | 33.6 | 9 | 33.6 |
| 18 | 10 | 36.0 | 10 | 36.0 |
| 20 | 12 | 36.7 | 11 | 38.2 |
| 22 | 13 | 39.0 | 13 | 39.0 |
| 24 | 14 | 41.5 | 14 | 41.5 |
| 26 | 16 | 42.5 | 16 | 42.5 |
| 28 | 17 | 44.3 | 17 | 44.3 |
| 30 | 19 | 46.0 | 18 | 46.0 |

The number of inputs for a specified array depends on the way in which the outputs are connected, i.e. whether full or limited availability conditions apply. In either case, if the availability is known, and in addition in the limited case, the number of groups in the grading and the number of outputs, is known, then the permitted input traffic can be determined. When the total input traffic has been determined, the number of input circuits N can be found from a knowledge of the mean traffic for each input, and knowing the value of N determines the number $g$ of A switches, since the number $n$ of inputs per A switch has already been found.

As a first approach it may be assumed that the minimum number of groups in a grading for a given availability is $2R/m$ where R is the number of circuits involved and $m$ is the the availability.

Table 3 shows typical values for R for smooth traffic and a specified loss.

TABLE 3.—TRAFFIC TABLE B20 (m=20) WITH .005 BLOCKING

| Output trunks (R) | Traffic capacity in Erlangs | Groups | Traffic per group |
| --- | --- | --- | --- |
| 100 | 72.4 | 10 | 7.24 |
| 120 | 87.8 | 12 | 7.30 |
| 140 | 103.0 | 14 | 7.40 |
| 160 | 118.5 | 16 | 7.40 |
| 180 | 133.8 | 18 | 7.42 |
| 200 | 149.2 | 20 | 7.42 |

In effect the contribution of each group in the various gradings is substantially independent of the number of groups.

Similar results are obtained for pure chance traffic and for other availabilities.

Typical results are:

|   | Traffic per group, erlangs |
| --- | --- |
| Smooth traffic availability 20 | 7.2 |
| Smooth traffic availability 10 | 2.7 |
| Pure chance traffic availability 20 | 6.5 |

Figure 4:
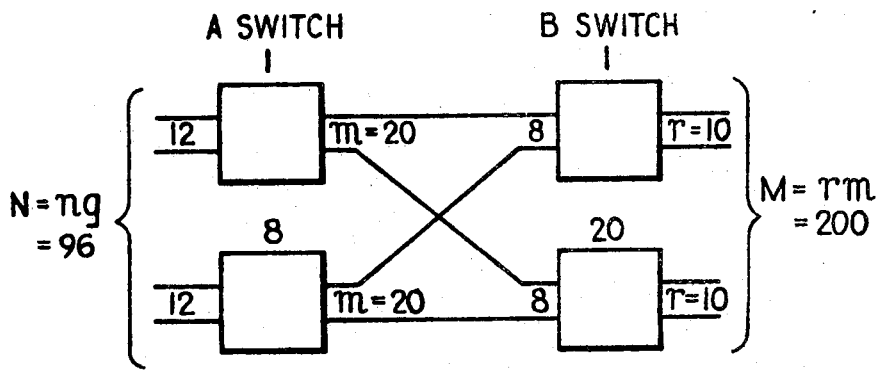

Typical calculation in order to determine input traffic and therefore number of input circuits for array as in FIG. 4 (i.e. 96–200) would be:

(a) number of output routes, $r=10$,
(b) availability per output route, $m=20$,
(c) assume that the inputs have a mean loading of 0.72 erlang and that the traffic is smooth,
(d) assume that each of the 10 output routes serves a 10 or more group grading with an availability of 20 and a total of 100 outputs,
(e) assume that the incoming traffic to the N inputs, divides equally over the 10 output routes.

Then:

(i) from Table 3 the traffic capacity of the 100 output grading is 72.4 erlangs at 0.005 blocking,
(ii) from (e) above each of the 10 output routes supplies 7.2 erlangs to its associated grading. The total traffic flow for a grading is therefore 72 erlangs,
(iii) as a grading is carrying 72 erlangs at a specified blocking [see (i)], then 72 erlangs can be offered at the input, and as each input circuit is stated to be loaded with 0.72 erlang [see (c)], then the array can just support 100 input circuits,
(iv) each A switch has $n=12$ inputs (Table 2), so that the number $g$ of A switches is found by dividing 100 by 12 and the nearest convenient value is 8, giving a total of input circuits N as 96, as shown in FIG. 4. The cross-points per input are 36.7 (Table 2),
(v) with $N=96$ inputs, the total input traffic is $96 \times 0.72$ equals 69.5 erlangs which is distributed over 10 output routes at 6.95 erlangs per route, instead of the assumed value of 7.2 erlangs used for making the calculation. This however gives a factor of safety on blocking or alternatively some loss in efficiency.

The number of input A switches could be increased from 8 to 9 and one input on each group left spare, in which case the cross-points per input would be increased from 36.7 to 37.6 but the output gradings would each be fully loaded to 7.2 erlangs.

FIG. 4 is a preferred arrangement in accordance with FIG. 3, for a single unit of a switching stage based on conditions relating to availability, traffic offered, permissible lost traffic etc. in accordance with a specified blocking factor i.e. grade-of-service (G.O.S.)

It shows an NM switch, where $N=96$ and $M=200$, and where $N=ng=12 \times 8$, and $M=rm=10 \times 20$.

It corresponds to a Strowger system of 96 switches multiplied to 200 outputs, made up of 10 levels of 20 outlets each, as in FIG. 2.

Figure 5:
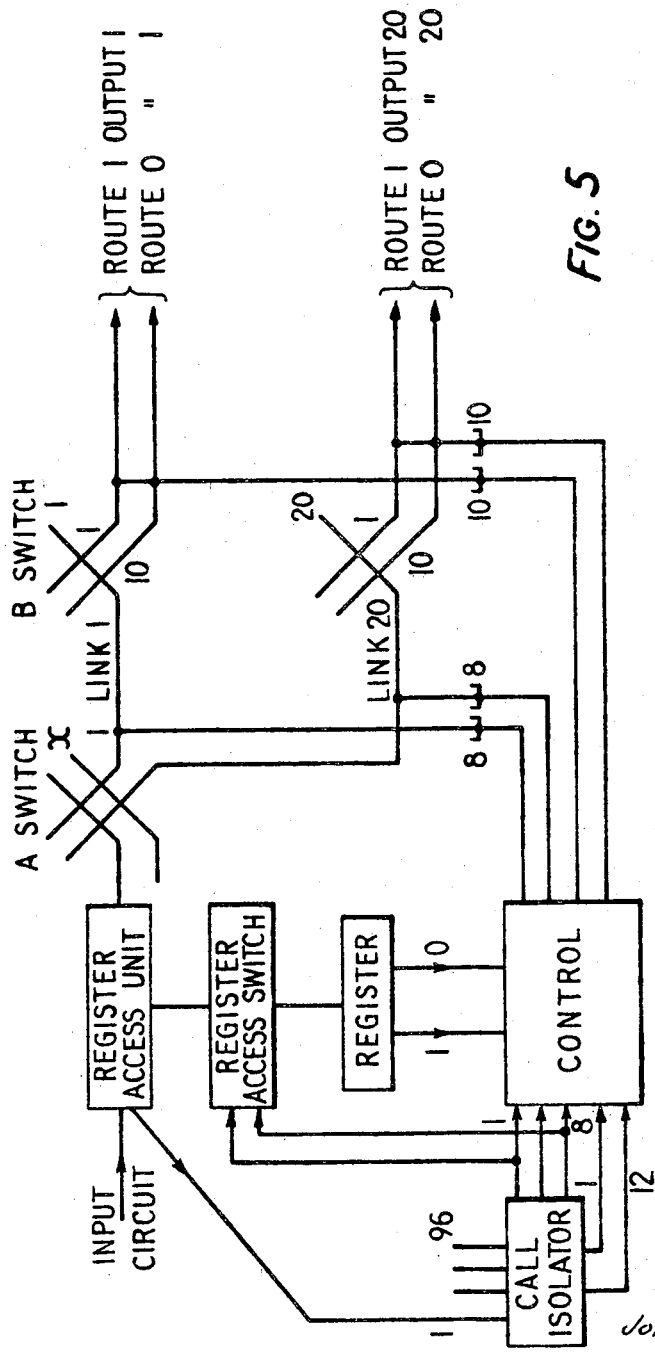

FIG. 5 shows one input circuit connected via its unique register access means to one of the A switches, designated A$x$. Via the cross-points of the A switch, the input circuit has access to 20 AB links, each link being connected to a different B switch. Each B switch has 10 output circuits, consisting of the same relative numbered output from each of the routes 1 to 0.

Figure 6:
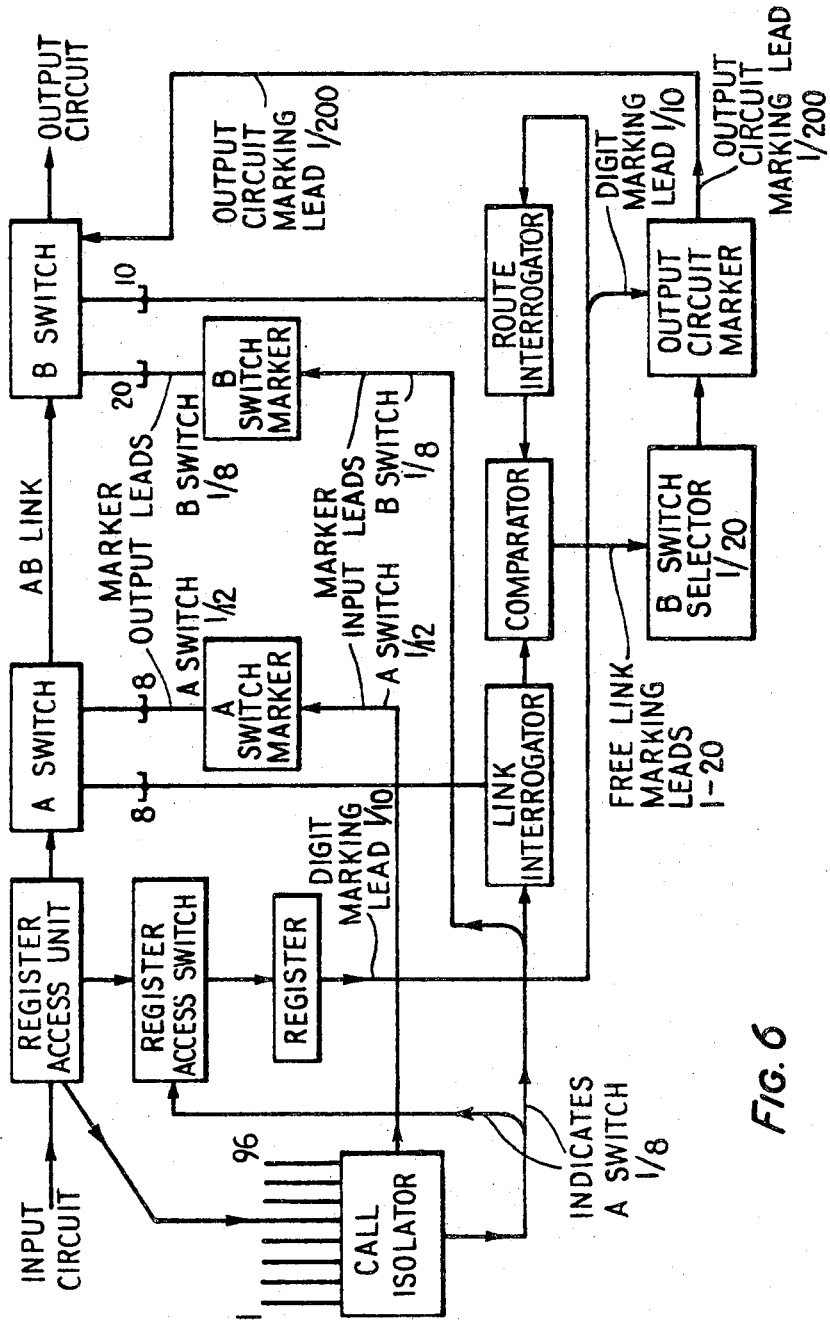

FIG. 6 shows a block schematic diagram of a single unit of a switching stage, as depicted in FIG. 5 in accordance with FIG. 4.

An individual input circuit is connected to its own register access unit and thence to a particular A switch. When a request for connection is received on the input circuit, the register access unit marks the input circuit's lead in the call isolator (1 out of 96) and also applies to the register access switch for connection to a register.

It should be noted that there may be more than one register, particularly in cases when the incoming information is received at a slow rate, e.g. as a dialled digit, each register then being allotted to a different calling circuit, but only one register at a time can be associated with the control means to set up a connection through the stage. When the information is received at a fast rate, one register only will probably be sufficient.

As more than one input circuit may be calling and therefore marking the call isolator, the call isolator makes a selection and isolates the selected circuit for connection with the control means. The call isolator indicates a 1 out of 12 selection to the A switch marker and a 1 out of 8 selection to the register access switch, to the B switch markers and to the link interrogator.

When a register connected to an input circuit has received and stored information from the circuit designating the route to which connection is required, the register must first secure sole access to the control means of the stage, through its register access switch. The register will then mark the corresponding 1 out of 10 leads to the route interrogator and to the output circuit marker.

The link interrogator now determines and indicates to the comparator, all free AB links from the marked A switch, and likewise the route interrogator determines and indicates to the comparator, all free outputs in the marked route (the A switch has 20 outgoing AB links, one link to each of the B switches, and each B switch has 10 outputs, comprising the same relative numbered output from each of 10 routes, e.g. B1 switch deals with output 1 of routes 1 to 0, B2 switch, output 2 of routes 1 to 0, and so on, to B20 which deals with output 20 of routes 1 to 0).

The input circuit connected to a particular A switch, can therefore gain access to any of the routes via any of the B switches provided that both the AB link and the correspondingly numbered output from the B switch are free. Link 1 from any A switch connects to B1 switch and connection can be made only to output 1 of any of the routes 1 to 0. Likewise a connection via a link 2 can be made only to an output 2, and a connection made via a link 20 can be made only to an output 20.

The link interrogator can indicate to the comparator any or all of the 20 links that are free, while the route interrogator can indicate to the comparator, any or all of the 20 outputs of a given route that are free. The comparator then indicates on its 1–20 marking leads, any coincidences in which the same-numbered link and output are both free. If link 1 and output 1 are both free, this is indicated by the comparator on marking lead 1, or if link 20 and output 20 are both free this is indicated on marking lead 20. But, if, say, link 2 is free and output 2 is busy, this is not indicated.

The marking leads from the comparator are applied to a 1 out of 20 selector, which indicates its selection to an output circuit marker, to which the decimal digit indicated by the register is also connected as an input. The output circuit marker therefore indicates a 1 out of 200 selection and marks the individual output circuit in the route designated by the register.

Each AB link comprises four leads, namely A, B, S and H, the A and B leads forming the speech circuit, the S lead being used for interrogation and the H lead for marking and holding.

Figure 7:
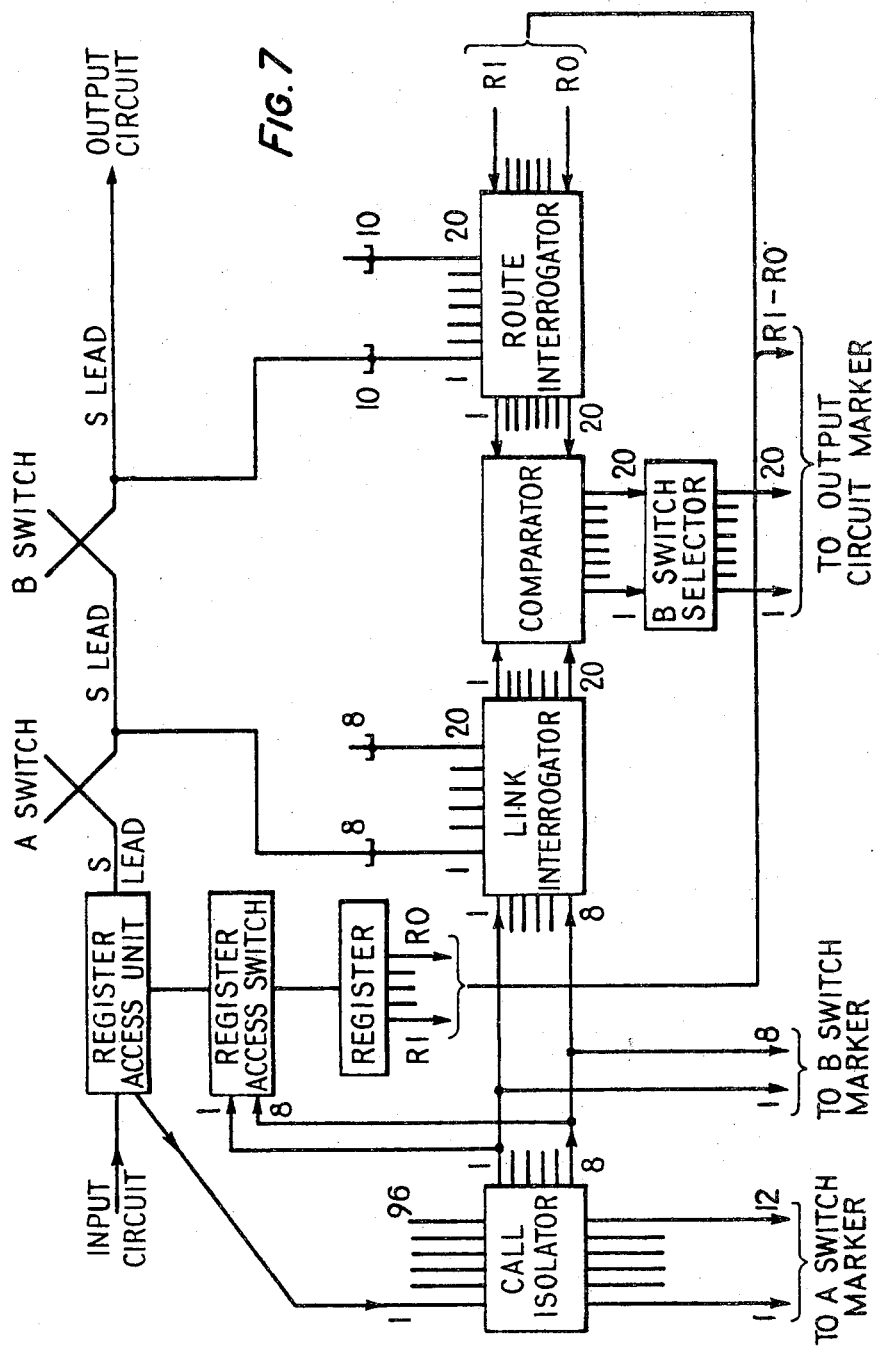

FIG. 7 shows the interrogation of the links and routes, which is actually done over the S leads.

As described broadly relative to FIG. 6, the call isolator marks 1 out of 8 leads to the register access switch, to the B switch marker and to the link interrogator. Each of the 20 leads from the link interrogator to the links, is commoned to the 8 A switches.

In like manner, each of the 20 leads from the route interrogator to the 20 outputs of the routes, is commoned to the same numbered output of the routes 1 to 0. The link interrogator indicates all free links to the comparator and the route interrogator indicates to the comparator all free outputs in the designated route and the comparator will indicate on the respective ones of its output leads 1–20 any coincidences of a free link and the same-numbered free output. These indications are given to the B switch selector, which indicates which one of the link/output coincidences shall be used for the connection. This selection, in combination with the decimal digit designated by the register, is indicated to the output circuit marker.

Figure 8:
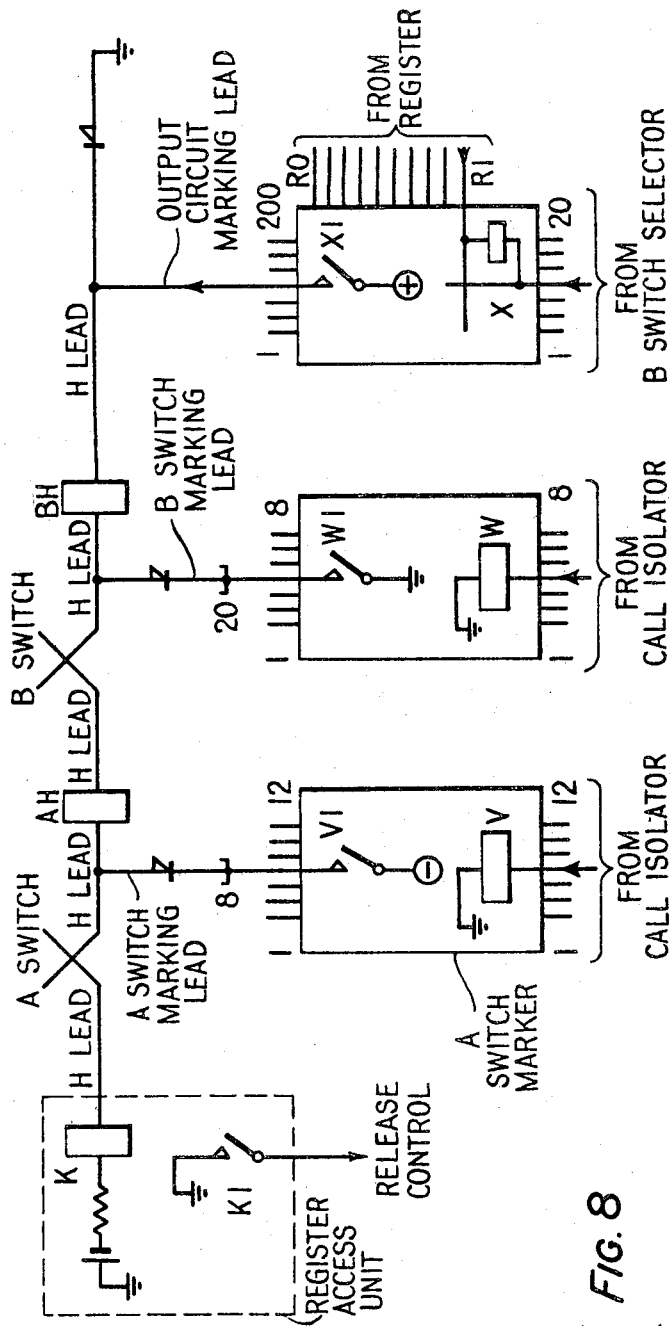

FIG. 8 shows in more detail the marking and operation of the A and B switches used for the connection, this being done over the H leads.

The 1 out of 20 indication from the B switch selector in combination with the decimal digit indicated by the register, operates a cross-point (relay X) in the output circuit marker. Contact X1 connects a positive potential to the 1 out of 200 marking lead designating the output circuit. This is connected to the H lead of the marked B switch and via BH relay of the B switch to an earth on the B switch marking lead from the B switch marker, due to the W relay operated by the 1 out of 8 selection from the call isolator. The BH relay operates and causes the B switch to operate, and extend the positive potential condition on the H lead via AH relay of the A switch to a negative potential on the A switch marking lead from the A switch marker, due to the V relay operated by the 1 out of 12 selection from the call isolator. The AH relay operates causing the A switch to operate and extend the H lead to the K relay in the register access unit of the input circuit. K relay operates and holds over the H lead through the A and B switches to the rectifier earth, the other conditions on the H leads being removed when the control is released as a result of the operation of K relay in the register access unit of the input circuit.

Figure 9A:
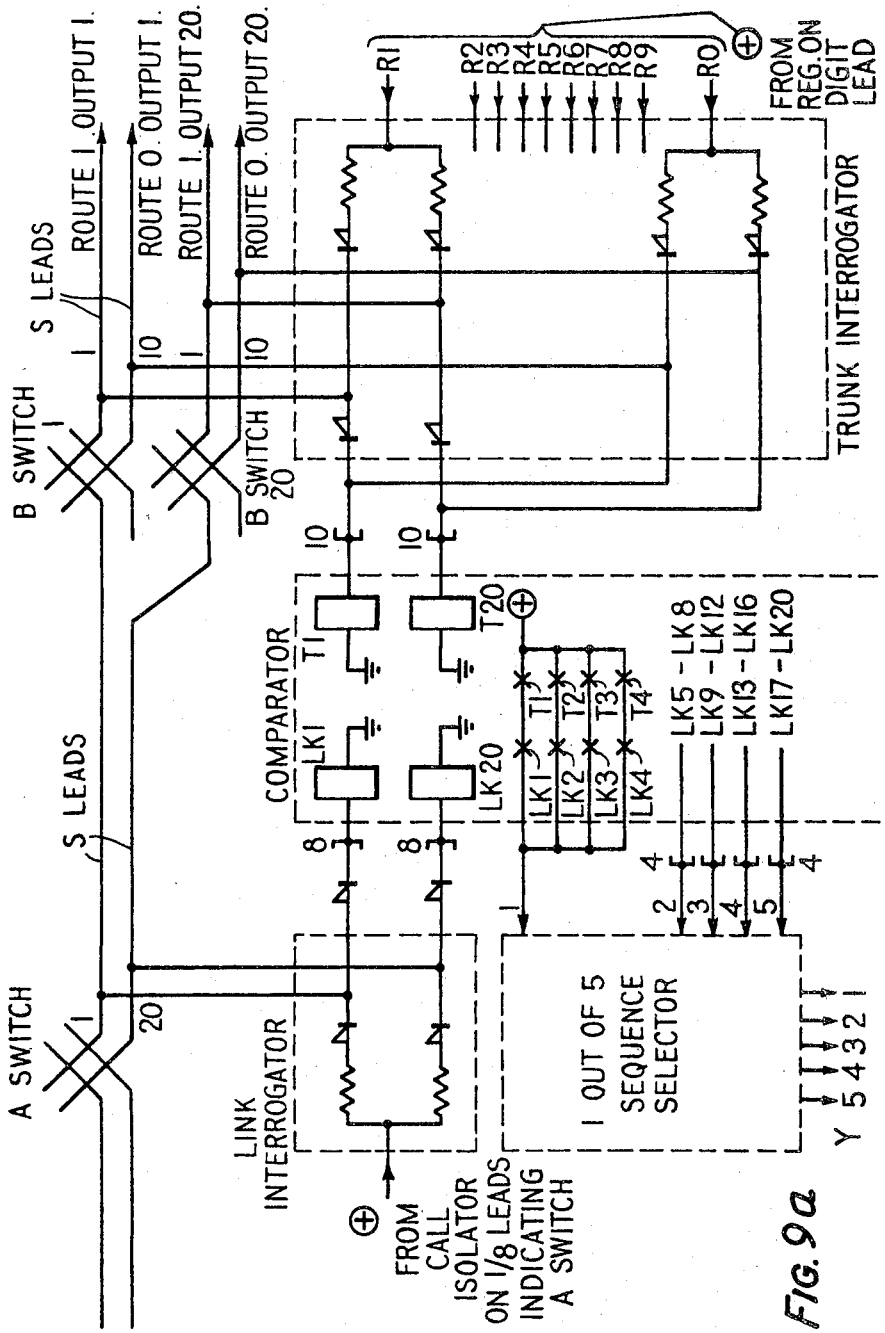
Figure 9B:
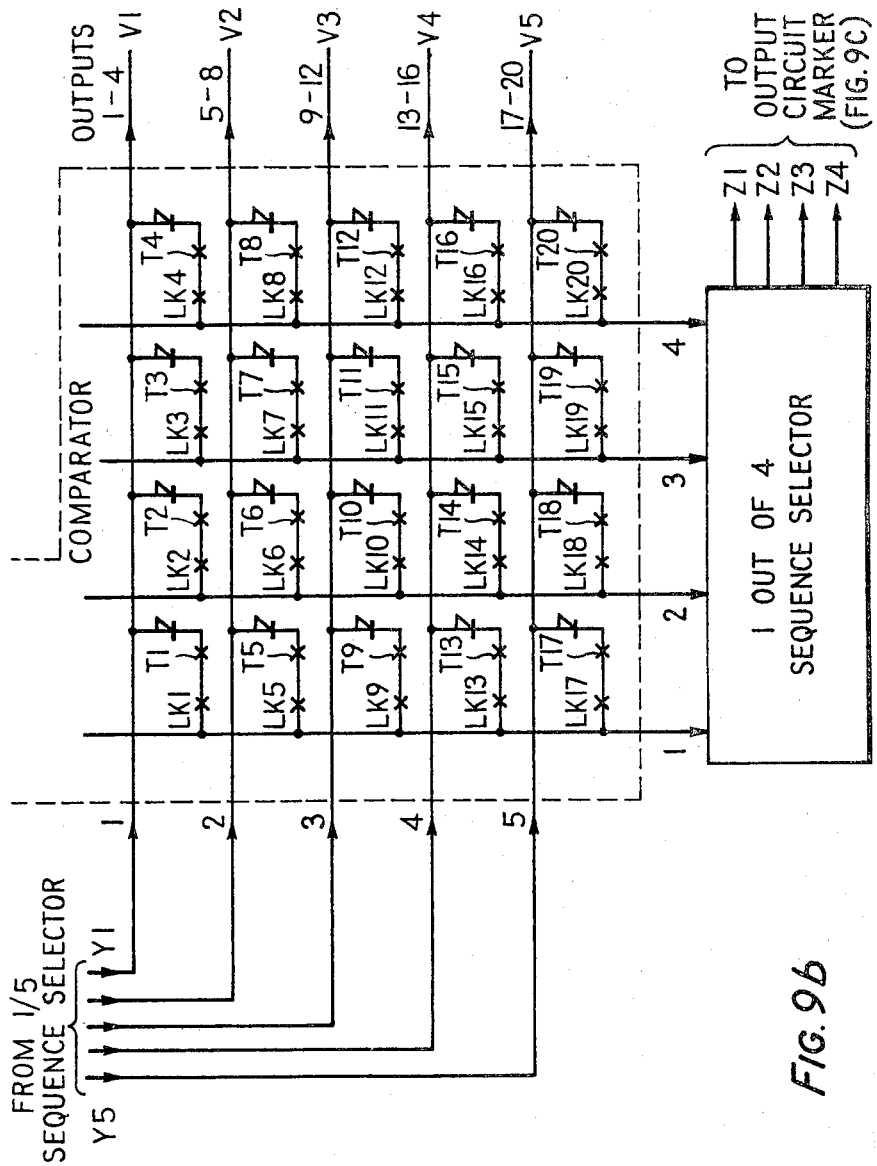
Figure 9C:
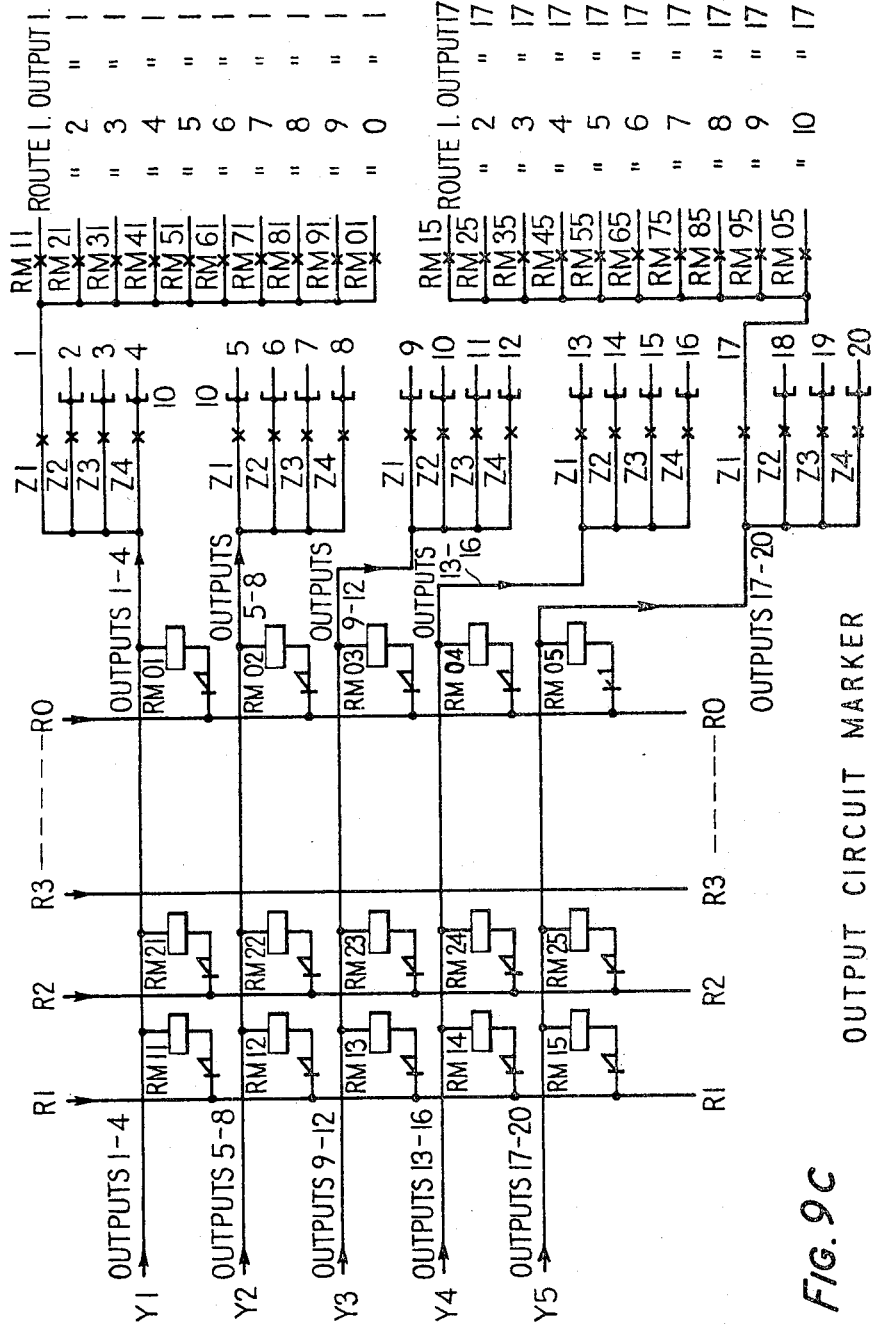
Figure 13:
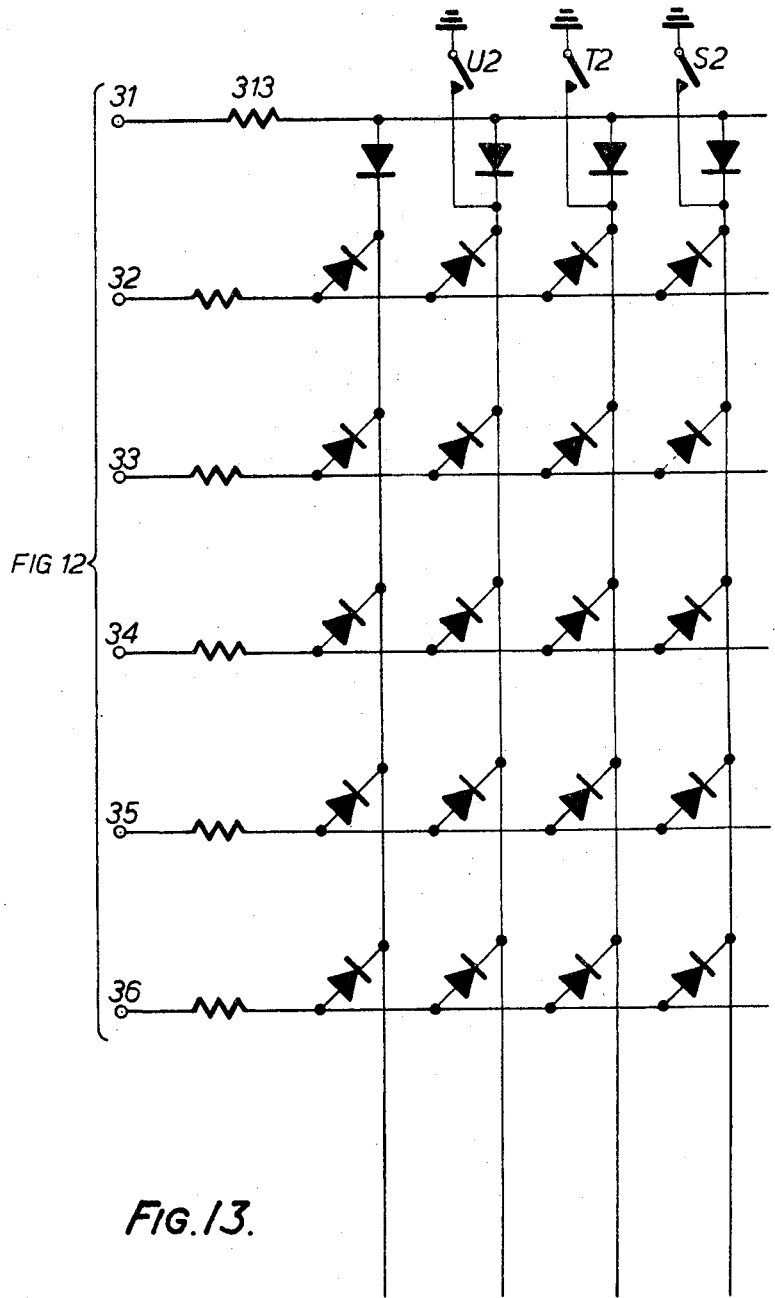
Figure 14:
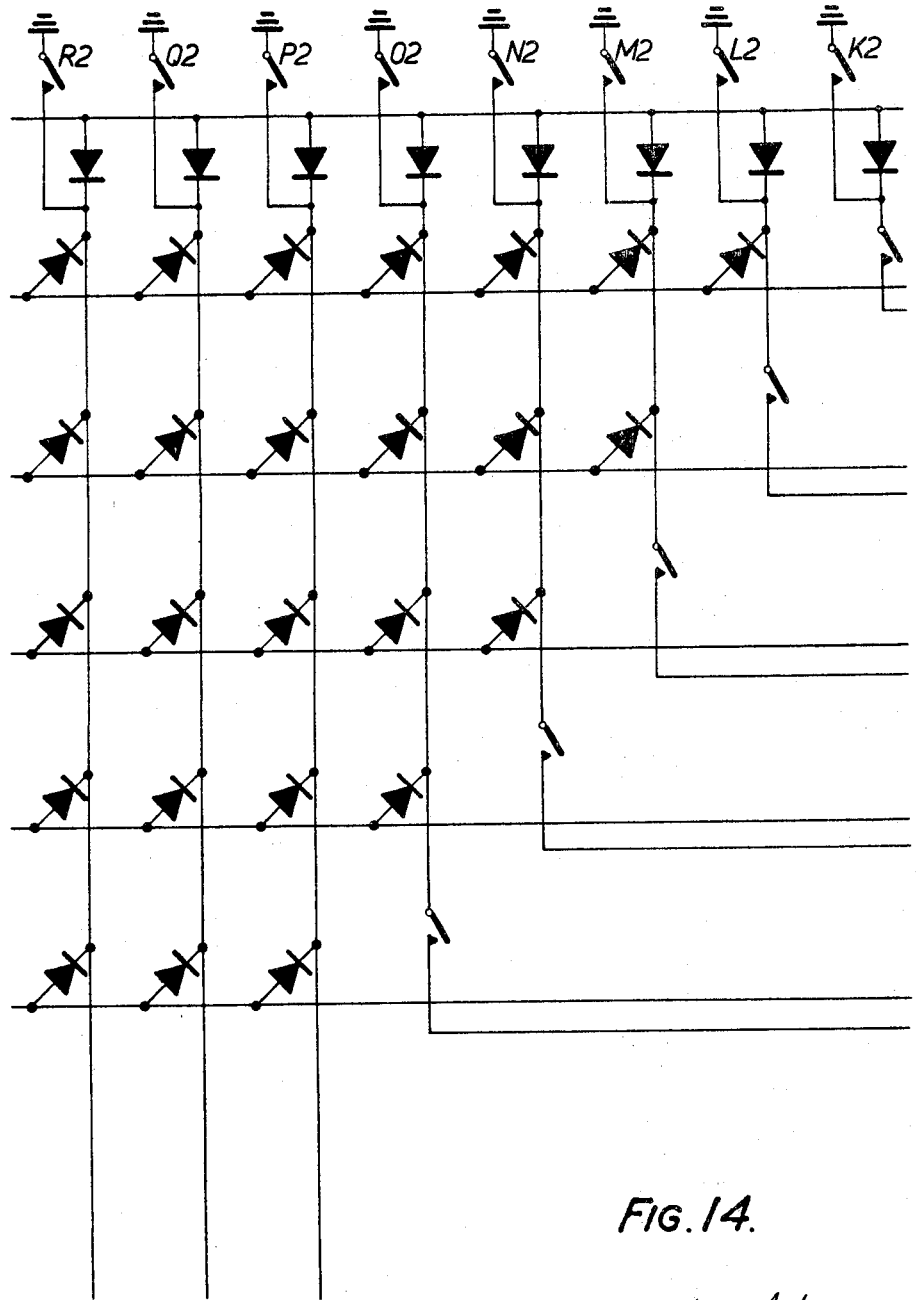
Figure 15:
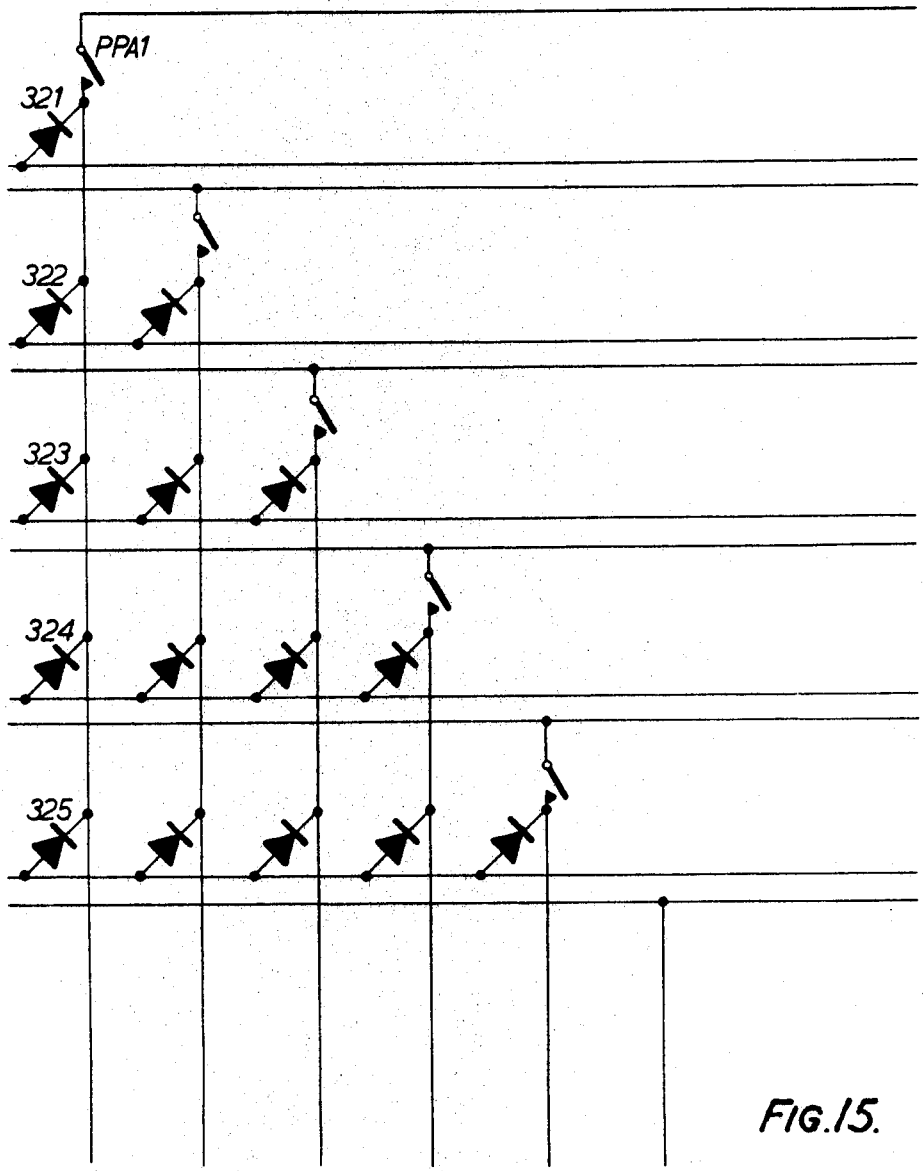
Figure 16:
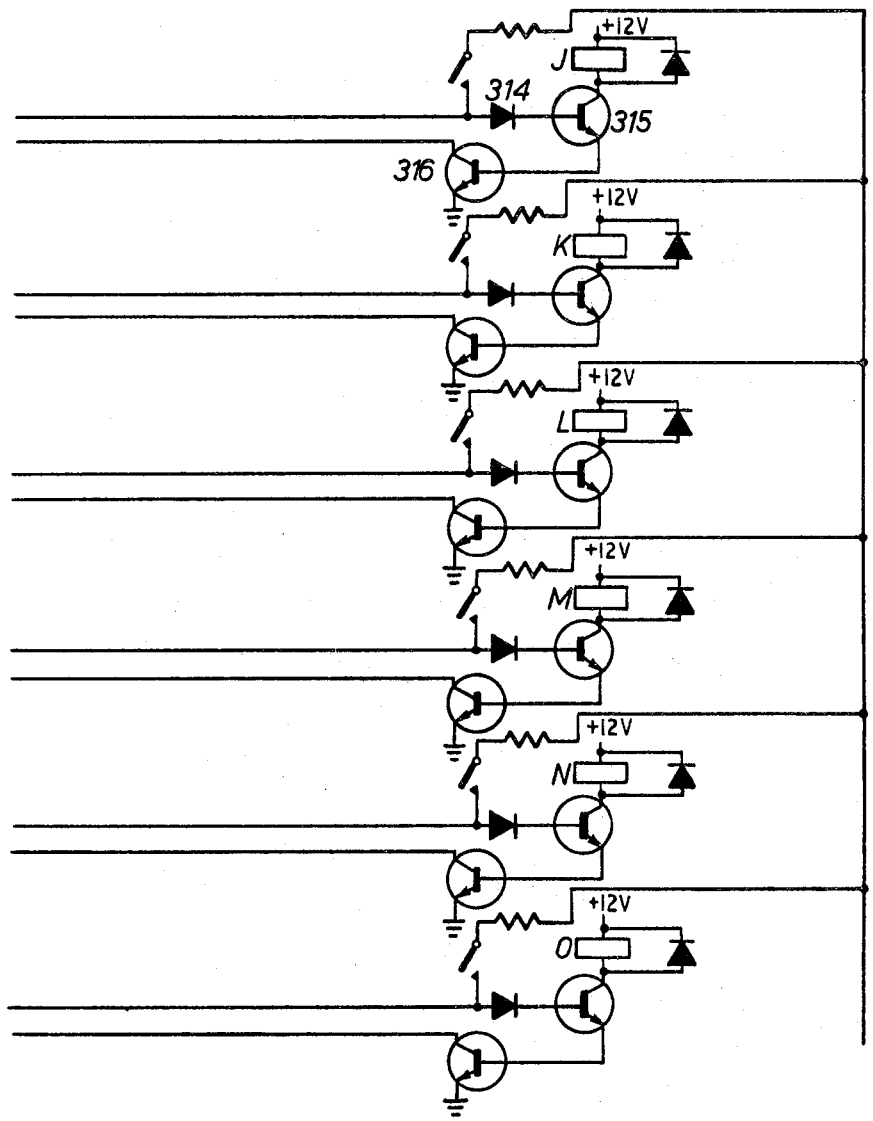
Figure 17:
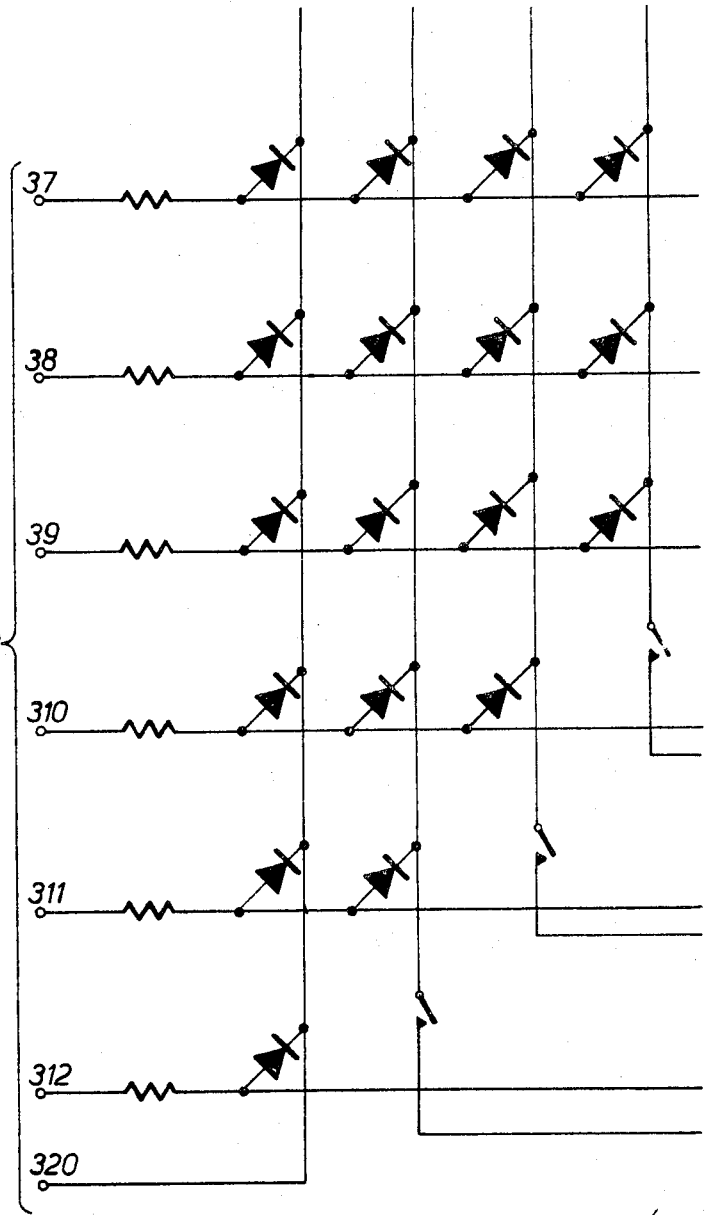
Figure 18:
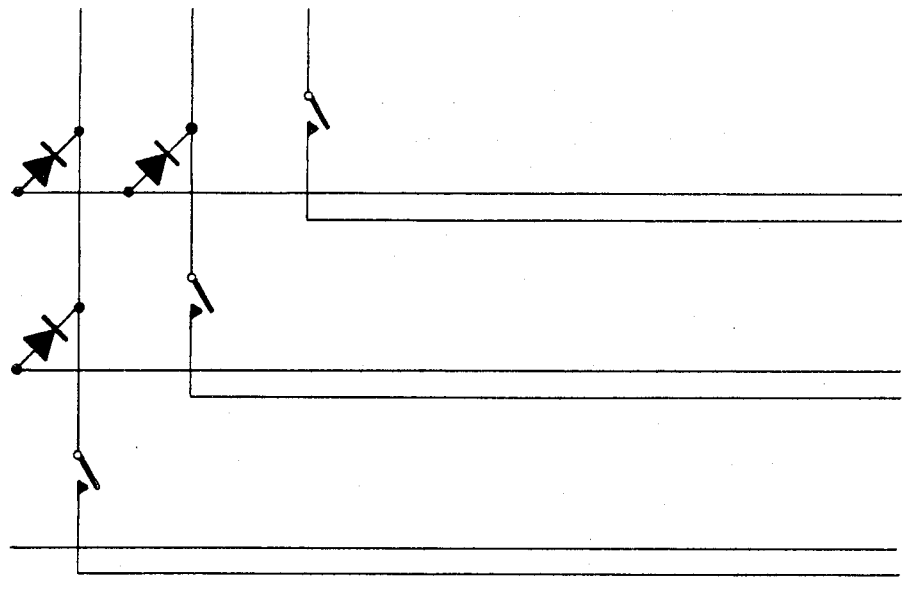
Figure 19:
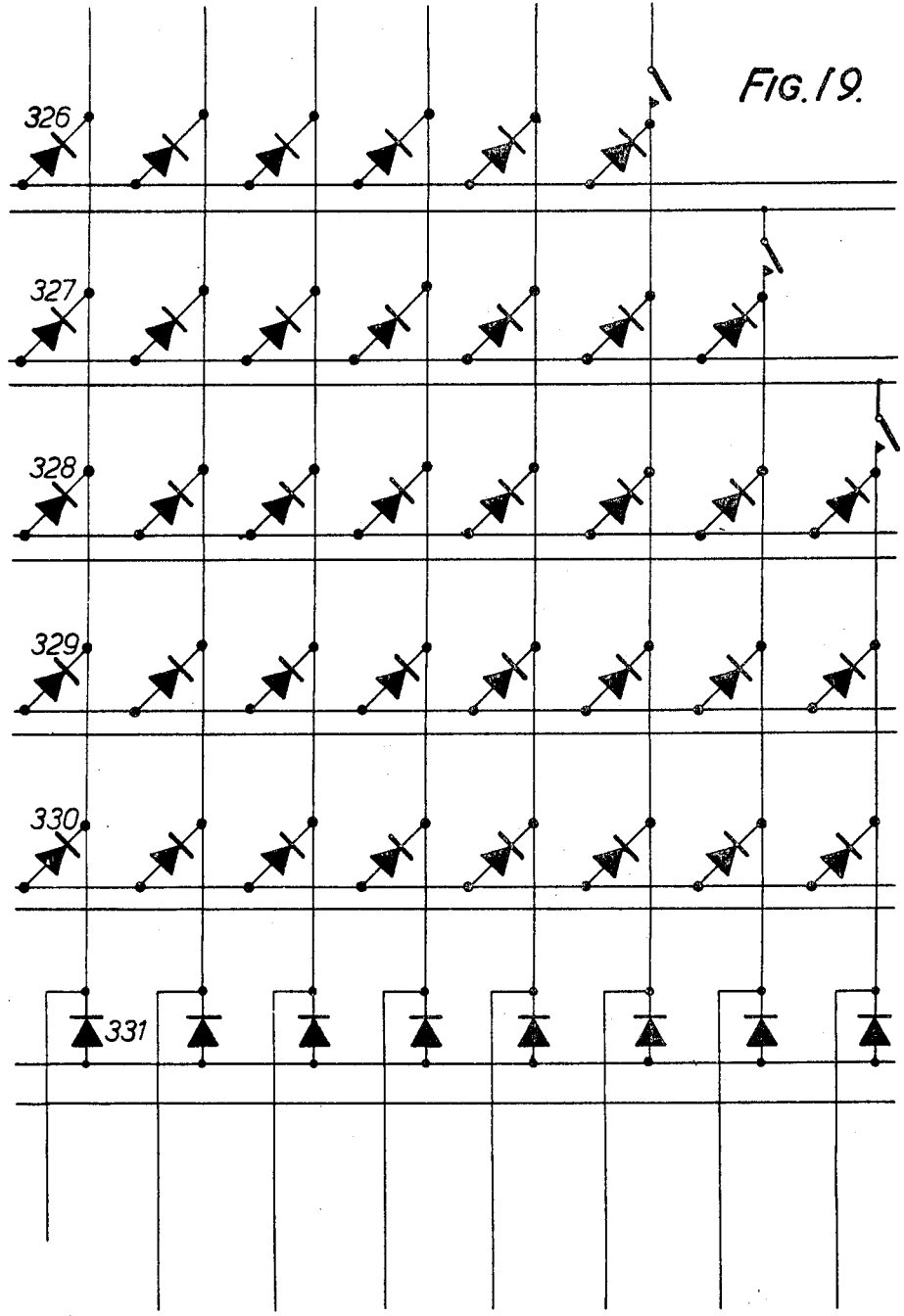
Figure 20:
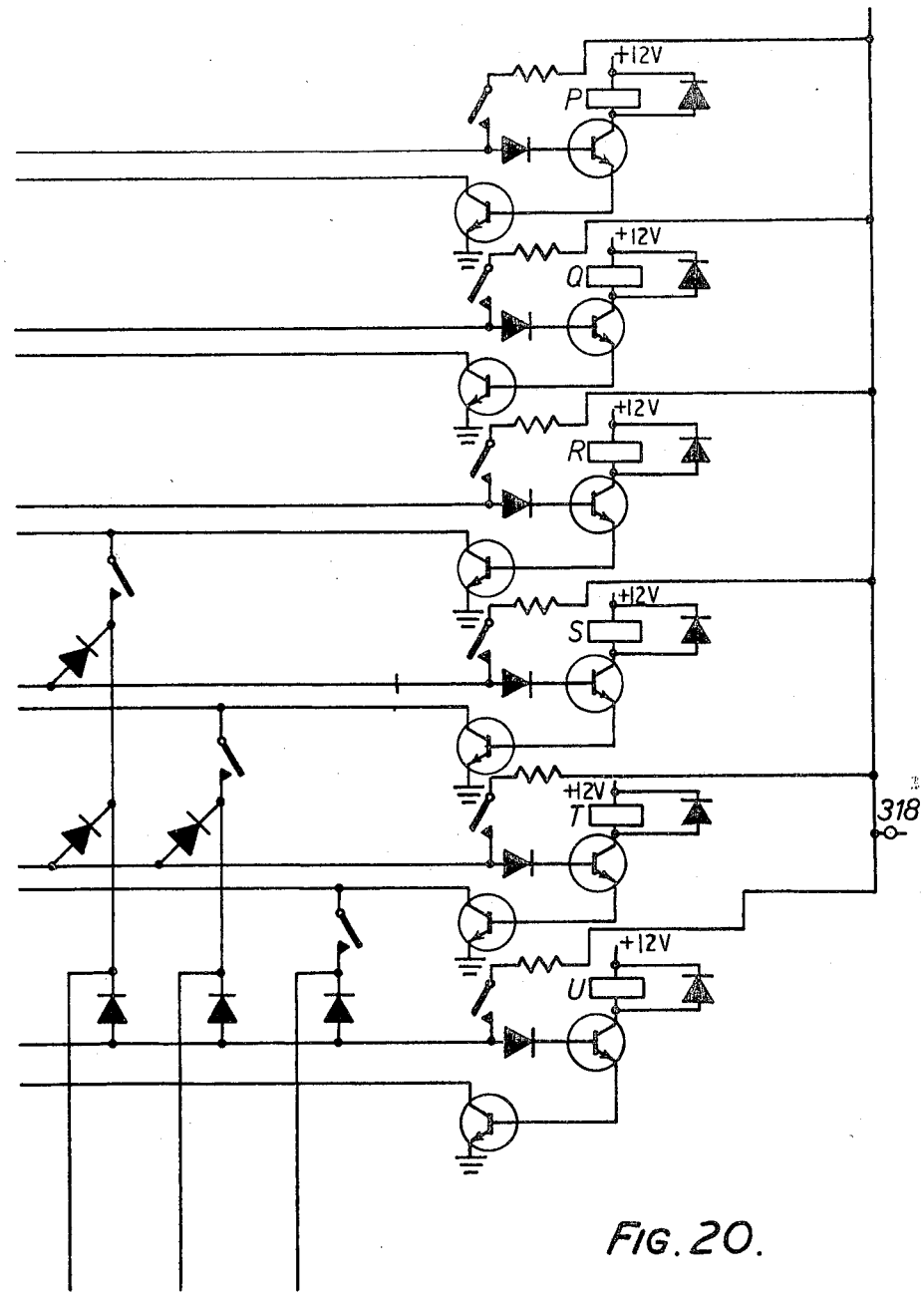
Figures 21, 38:
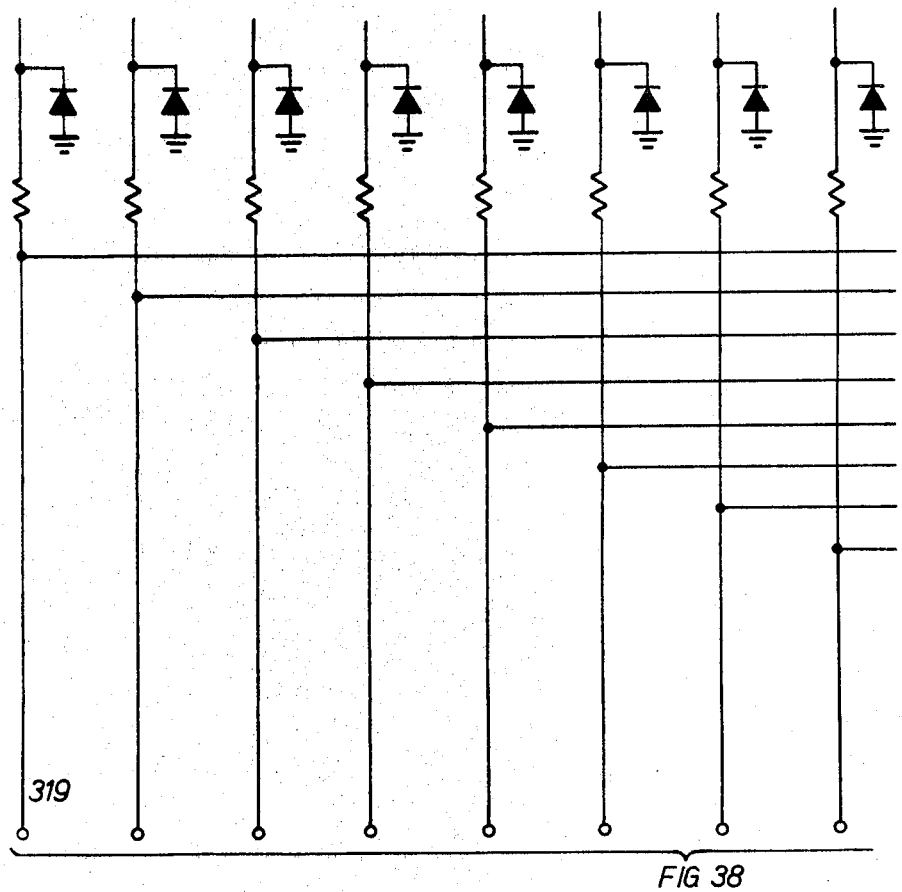
Figure 22:
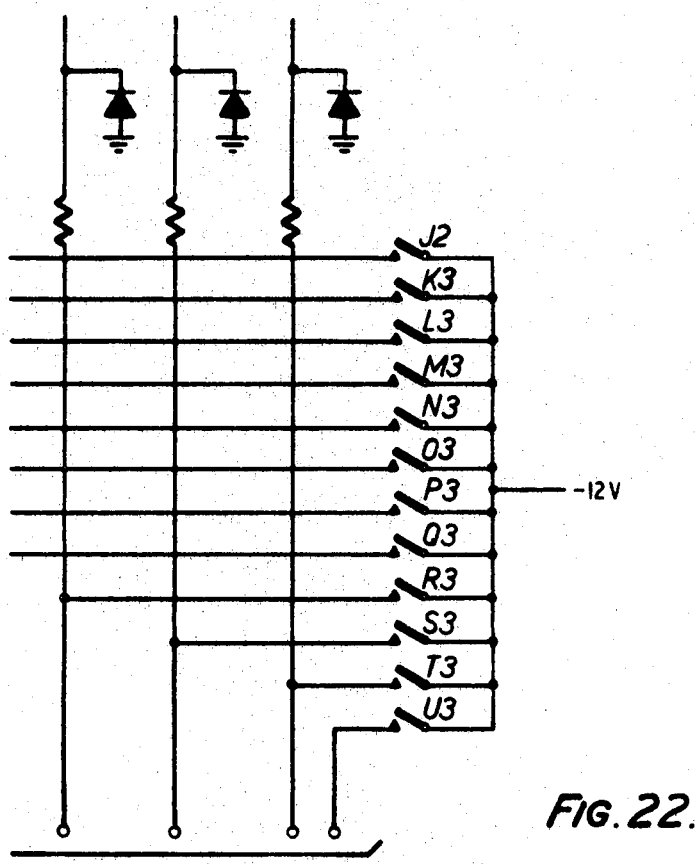
Figure 23:
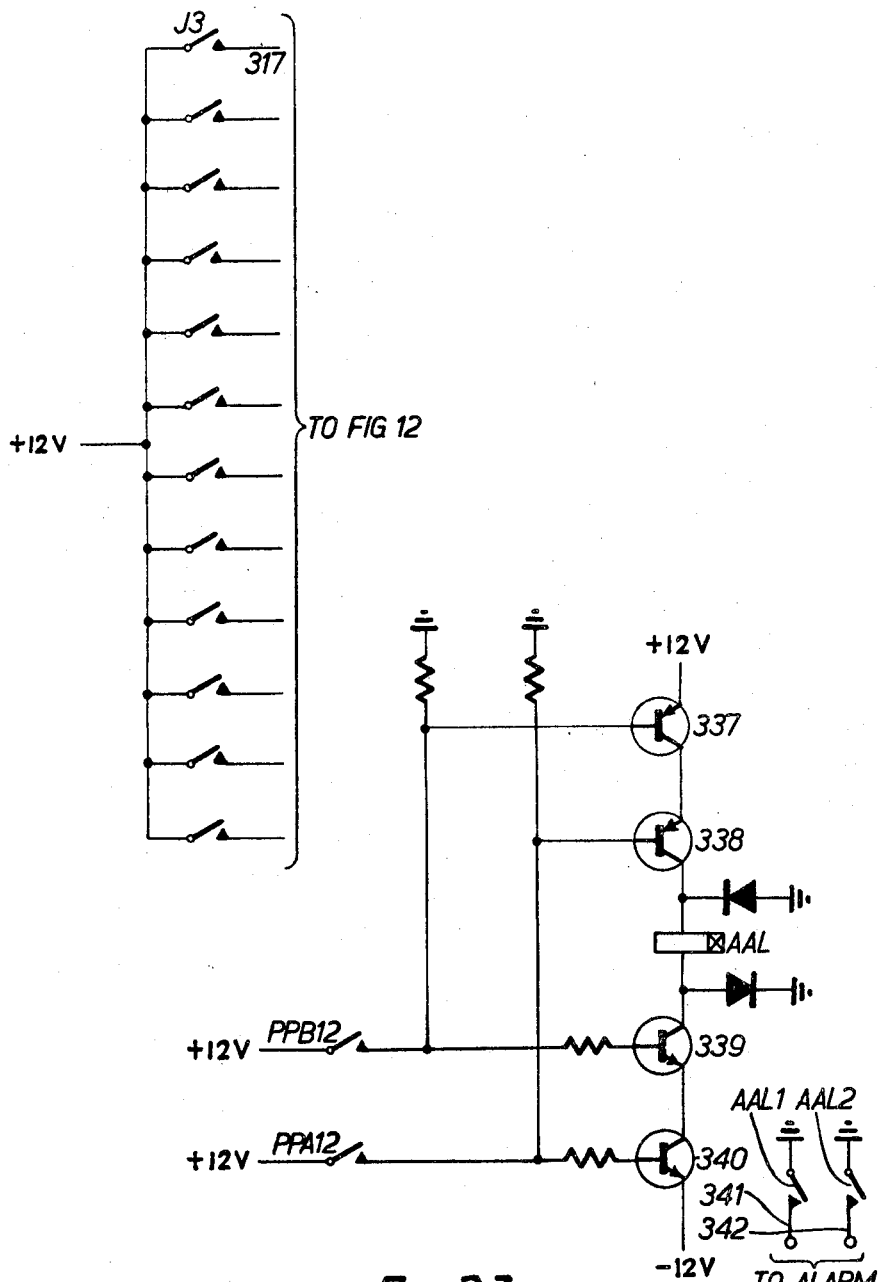

FIGS. 9A, B, C and D, arranged as shown in FIG. 10, show in some detail the interrogation circuit for a preferred embodiment.

It is assumed to be the same trunking as shown in FIG. 4, in that there are 8 A switches and 20 B switches. There are 20 AB links leaving each of the 8 A switches, each link going to a different one of the 20 B switches, so that each B switch has 8 links coming into it, one from each of the 8 A switches. Each of the 8 incoming links to a B switch is commoned to a LK relay to earth (LK1 for B1 etc. giving 20 LK relays). In a B switch any cross-point that is operated causes an earth (from the output circuit) to short-circuit the LK relay.

When it is required to interrogate the AB links leaving an A switch, a+ve supply is connected to the S lead of all the 20 AB links in common. This +ve is therefore offered to each of the LK relays, i.e. one in each B switch, and those LK relays will operate that are not shorted-out by a busy condition earth from a cross-point operated to the link. Therefore any number (including none and all) of the LK relays may be operated.

As already stated in connection with FIG. 5, the 10 outputs of each of the 20 B switches, consist of the same relative number output from each of the routes 1 to 0. Thus the B1 switch has the number one output from each of the routes 1 to 0, while the B20 switch has the number twenty output from the routes 1 to 0. The 20 outputs of route 1 therefore appear as the first output of each of the B switches 1 to 20.

In this embodiment it is assumed that the decimal digit 1 has been indicated by the register, indicating that connection is required to route 1. The free AB links have already been found and it is now necessary to interrogate the outputs of route 1 in order to find which are free. On the output side of the 20 B switches, all of the S leads of the same numbered outputs of the 10 routes are commoned, each common being connected to a T relay to earth, there being 20 T relays in all. Interrogation of a particular route is carried out in a manner similar to that for the AB link. A +ve supply is connected by the register to one of the leads R1 to R0, indicated by the decimal digit, each of these leads being connected to its associated common of twenty outputs. In this way the +ve is offered to 20 T relays and any of these not shorted-out by earth from an engaged output, will operate.

There are now relays operated in the group LK1 to 20 in accordance with the state of the AB links, and relays operated in the group T1 to 20 in accordance with the state of the outputs of the B switches.

The state of the 20 LK and the 20 T relays is examined in the comparator. Contacts of associated LK and T relays (i.e. LK1 and T1 etc.) are connected in series and offered to a 1 out of 20 sequence selector. Any or all of the LK and T combinations may be operated and one particular combination is selected. In the embodiment as described the 1 out of 20 selector, is formed by a 1 out of 5 selection and then a 1 out of 4 selection.

Assume that the 1 out of 5 selector marks output Y1. This means that at least some of LK1 to 4 and T1 to 4 combinations commoned in the comparator must be operated. With Y1 lead marked by the 1 out of 5 selector, it is cross-pointed with the 4 inputs to the 1 out of 4 selector, the cross-point connections being the four separated series connections of LK1, T1, LK2, T2, LK3, T3 and LK4, T4, one combination of which at least is operated. Assume that the 1 out of 4 selector marks its Z1 output, meaning that LK1, T1 has been chosen. The marked Y1 lead from the 1 out of 5 selector is also cross-pointed with the R1 to R0 leads from the register. In this case it has been assumed that the digit 1 is indicated by the register, Marking lead R1, and therefore the cross-point RM11 will be operated.

The mark on the Y1 lead is now extended through the operated cross-point Z1 and the operated cross-point RM11 to indicate route 1, output 1 as the output circuit to be used for the connection.

It is an objective that, as far as is practicable, control of selection should be associated with each AB array in order that the cost of control equipment should be more nearly proportional to traffic capacity than is possible for common control "overall" selection systems. There is also a security hazard to be avoided; this seems to be more easily achieved in systems in which control is largely associated with individual arrays, always provided that there are sufficient such arrays to permit some spreading of access to the arrays from any given source. The principle upon which the present proposal is based is that of stage-by-stage selection. This means that any input, to a switching stage, requires access to some form of stage controlling register, which, in its simplest form, need only accept enough information to direct a call to the desired outgoing trunk route. The seizure of a trunk in the required output route is independent of the state of the outputs of the following stage or trunk, exactly as in Strowger.

Thus each stage has one or more control registers to which all inputs have access. Each such register receives information enabling it to make a choice of the outgoing trunk route required.

The arrangement of FIG. 3 is more general than might appear from the description so far given. It is not necessary to equalize the traffic distribution over output routes nor is it necessary to assume output gradings of 10 or more groups. Moreover any given output group could consist of one or more $m$-point arrays and any number of routes $r$ could be provided.

It does not follow that an infinite variety of switching arrays would be advantageous, but there could be advantage in a certain amount of individual design, provided that the basic arrays are designed in the first place to permit some variation in cross-point parameters and flexible allocation of circuits to inputs and outputs, not forgetting the need for corresponding flexibility in the control system.

Some important variations are examined as follows.

In the first place a two-stage array (FIG. 3) may have any number of output routes $r$ and any number of outputs per route $m$ with the simple restriction that $m$ is the same for every group. Manufacturing considerations require some limitation in the range of permitted variations; in the present context it seems reasonable to specify $m=10$ or 20, and $r=5$ or 10, but other values need not be ruled out. The availability on any particular output route can be a multiple of $m$, e.g. if $m$ is 20 and $r$ is fixed, availabilities of 20, 40 or 60 can be achieved at the cost of a reduced number of output groups for a given value of $r$. If higher availabilities are used, the blocking for a given value of $n$ will be reduced because each AB link now has access to two or more output trunks. This does not necessarily improve the efficiency of the array, by increasing $n$, unless all output groups are treated similarly. The order of the effect on the array, of providing say five output routes of 40 trunks per route instead of 10 routes of 20 trunks per route is shown in Table 4, which shows the approximate effect on array of increasing availability. In this table the blocking is derived from $b^{2x}=0.005$, to allow for the increased chance of finding a free trunk in the selected group, and $x$ represents the excess links at any A switch.

TABLE 4.—ARRAY SERVING 5 OUTPUT ROUTES OF 40 TRUNKS PER ROUTE

| m | Blocking=0.005 nominal | | | |
|---|---|---|---|---|
| | Mean traffic b | 2x | m+1−x=n | Cross-points per input |
| 20 | Full availability loading on 40 trunks requires 27 erlangs (mean loading per trunk= 0.67). | 14 | 21−7=14 | 34.2 |

The effect is not large, i.e. 2.5 cross-points per input, but it may be useful in some applications. In the general case with mixed availabilities there would be no saving in cross-points unless the loss on the lowest availability was increased. In what follows the reduced loss on higher availabilities will be ignored.

To illustrate the condition of different availabilities, let it be supposed that there are several blocks of traffic that require to be switched to several outgoing routes. A practical example would be traffic originating from several similar subscribers' units, to be distributed over routes 1, 7, 8, 9 and 0, where these digits have the significance usual in Strowger non-director working. To give dimensions assume:

| Route: | Traffic volume in erlangs |
|---|---|
| 1 | 26 |
| 7 | 100 |
| 8 | 80 |
| 9 | 70 |
| 0 | 60 |
| Total | 336 |

The traffic to be distributed is assumed to originate from 8 subscribers' units, each contributing 42 erlangs over 57 circuits at a loss of 0.005, this implying full availability, but it is not an essential requirement.

Gradings on the five outgoing routes are also assumed. The requirements for circuits for each route for an 0.02 loss are shown in Table 5.

TABLE 5

| Route | Traffic volume | Circuits required at 0.02 loss | | | Minimum number of grading groups | | |
|---|---|---|---|---|---|---|---|
| | | m=20 | m=40 | m=60 | m 20 | m 40 | m 60 |
| 1 | 26 | 36 | 35(FA) | 35(FA) | 4 | | |
| 7 | 100 | 126 | 114 | 114 | 14 | 6 | 4 |
| 8 | 80 | 102 | 94 | 94 | 12 | 4 | 2 |
| 9 | 70 | 89 | 84 | 84 | 10 | 4 | 2 |
| 0 | 60 | 77 | 72 | 72 | 8 | 4 | 2 |

Table 5 also shows the minimum number of grading groups required, based on either:

(a) the formula $G=2R/m$, where G, the number of groups, is greater than 6, R is the number of circuits and $m$ the availability, with even numbers only for G, or (b) formulas derived from tables for 2, 4 and 6 group gradings specifying maximum permitted trunks, thus:

| Groups: | Maximum trunks, m [1] |
|---|---|
| 2 | 1.6 |
| 4 | 2.5 |
| 6 | 3.18 |

[1] $m$=availability.

Remembering that, in the present context, the maximum number of grading groups G, is also the number of AB switch arrays, it is necessary to use a value for G that is equal to or less than the number of arrays. Table 5 shows first, that $m=40$ or 60, yields a marked reduction in the number of outgoing trunks required. This is of considerable cost advantage; hence in the example, $m=40$ or 60 should be used in preference to $m=20$, at least for four out of five routes. There is however no advantage in numbers of circuits between $m=40$ and $m=60$, and the lower value of 40 is to be preferred where applicable because this uses up fewer outgoing groups of 20. One possible allocation is a four group arrangement with the following allocations of 20 point "levels" to each group:

| Route | Number of "levels" allotted | Availability |
|---|---|---|
| 1 | 1 | 20 |
| 7 | 3 | 60 |
| 8 | 2 | 40 |
| 9 | 2 | 40 |
| 0 | 2 | 40 |

The total "levels" required is 10 each of 20 points, which satisfies the requirements for a "standard" AB switch array. The total number of inputs required is 456 (i.e. 8 times 57 in the example under discussion) subdivided into four groups of 114 per group. For $m=20$ and a loss of 0.02 the numbers of inputs per A switch is 11 (Table 1) calling for 11 A switches per AB array, yielding a capacity for 121 inputs. The cross-points per input are therefore $$\frac{38.2 \times 121}{114} \text{ (Table 2)} = 40.5$$

If all possible inputs were connected, the cross-points per input would be reduced to 38.2 on full arays, but spares would be felt on one of the four input arrays. The net result would be the same; the allocation of inputs is therefore a matter of local requirements. The apparent anomaly in Table 2 for $m=20$, which suggests that fewer cross-points per input are required for an 0.005 loss than for an 0.02 loss is due to rounding to secure integral values for $n$ that do not exceed the specified loss. In the present instance, if $n$ were increased to 12 requiring 10 A switches per array the loss for a 20 point output group would be $(0.655)^9=0.022$ which is probably tolerable for level 1, the only 20 point output group required. The cross-points per input would then be reduced to $$\frac{36.7 \times 120}{114}$$

equals 38.6. The 40 point output groups would not be effected.

Other groupings of inputs are possible, e.g., 8 input groups each accepting 57 inputs. The output groupings need to be adjusted to provide a satisfactory grading which can still be a 4 group if desired. Working on 11 or 12 inputs per A switch the number of cross-points per input is not affected, but the number of A switches per array is reduced because it depends on the expression $$m\left(1 + \frac{r}{n}\right)$$

always provided that $n$ is chosen as in Table 1. There could be some advantage in using 8 AB arrays instead of 4 in the example under discussion, in that the AB arrays could be obtained in smaller units, but the use of more AB arrays might increase the overall control costs. The balance of advantage therefore needs to be assessed from overall considerations, and not merely from the cross-point costs.

As a final point relating to the example just discussed, the eight subscriber units referred to, could well be eight 1000 line units, each originating 72 erlangs. For the given proportion of traffic (336 erlangs) to the five specified routes, the cross-points per line needed for this function would then be $$\frac{120 \times 4 \times 38.6}{8000}$$

assuming 12 point A switches, i.e., 2.3 per line, which does not seem unreasonable bearing in mind the flexibility of the arrangement and the saving in outgoing trunks made possible by the ability to allot one or more 20-point output groups to routes as required. Other combinations of lines and traffic would yield different but comparable results. Incoming and local routings also require similar treatment.

Summarising, it has been established that the basic properties of Strowger trunking can be reproduced by relatively simple two-stage reed-relay switching units. Further it has been shown that new properties leading to added flexibility in application can be obtained. In application the two-stage multi-level array may be used in trunking schemes much in the same way as Strowger selectors.

A more detailed description of the preferred embodiment will now be given in conjunction with FIGS. 11–51 of the accompanying drawings.

*Incoming circuit calling—FIG. 11*

Figure 25:
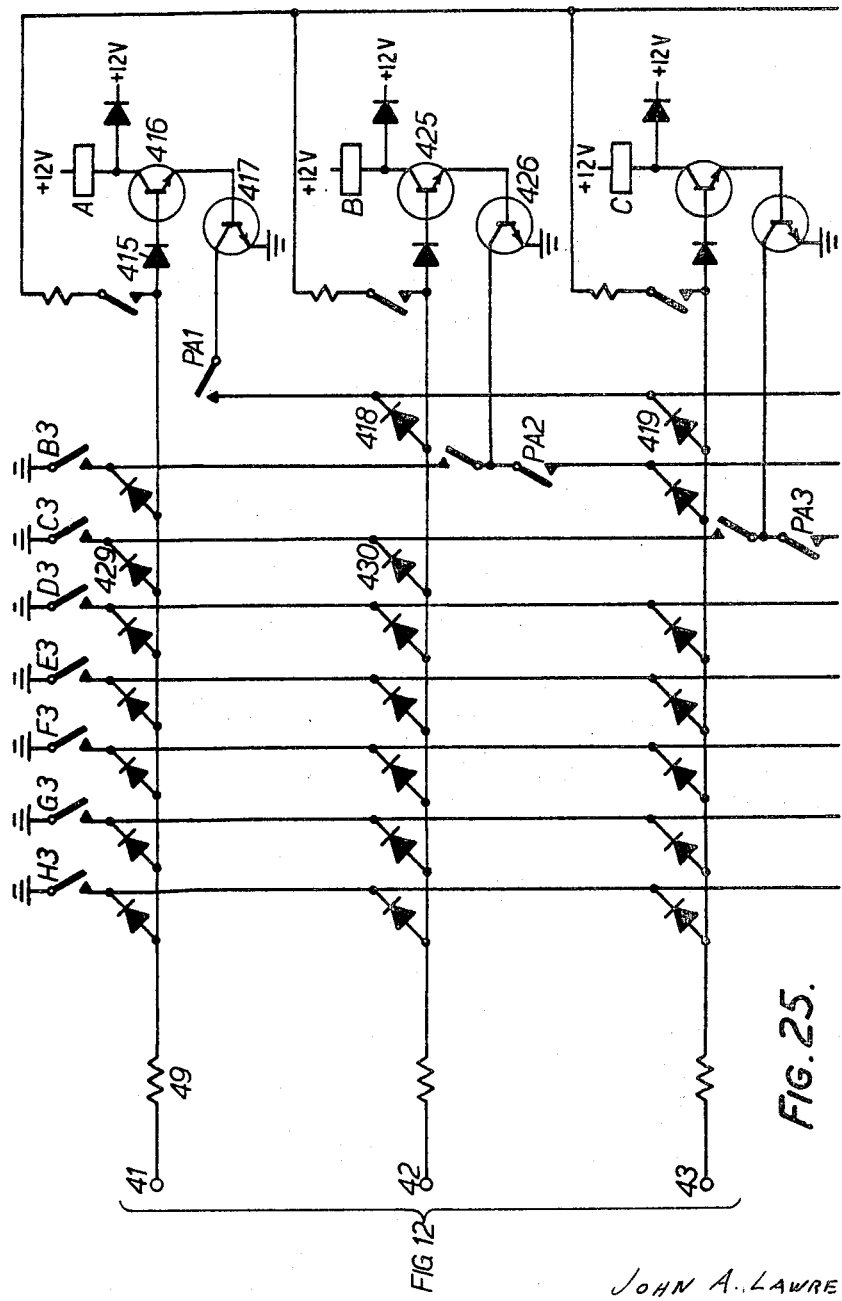
Figure 26:
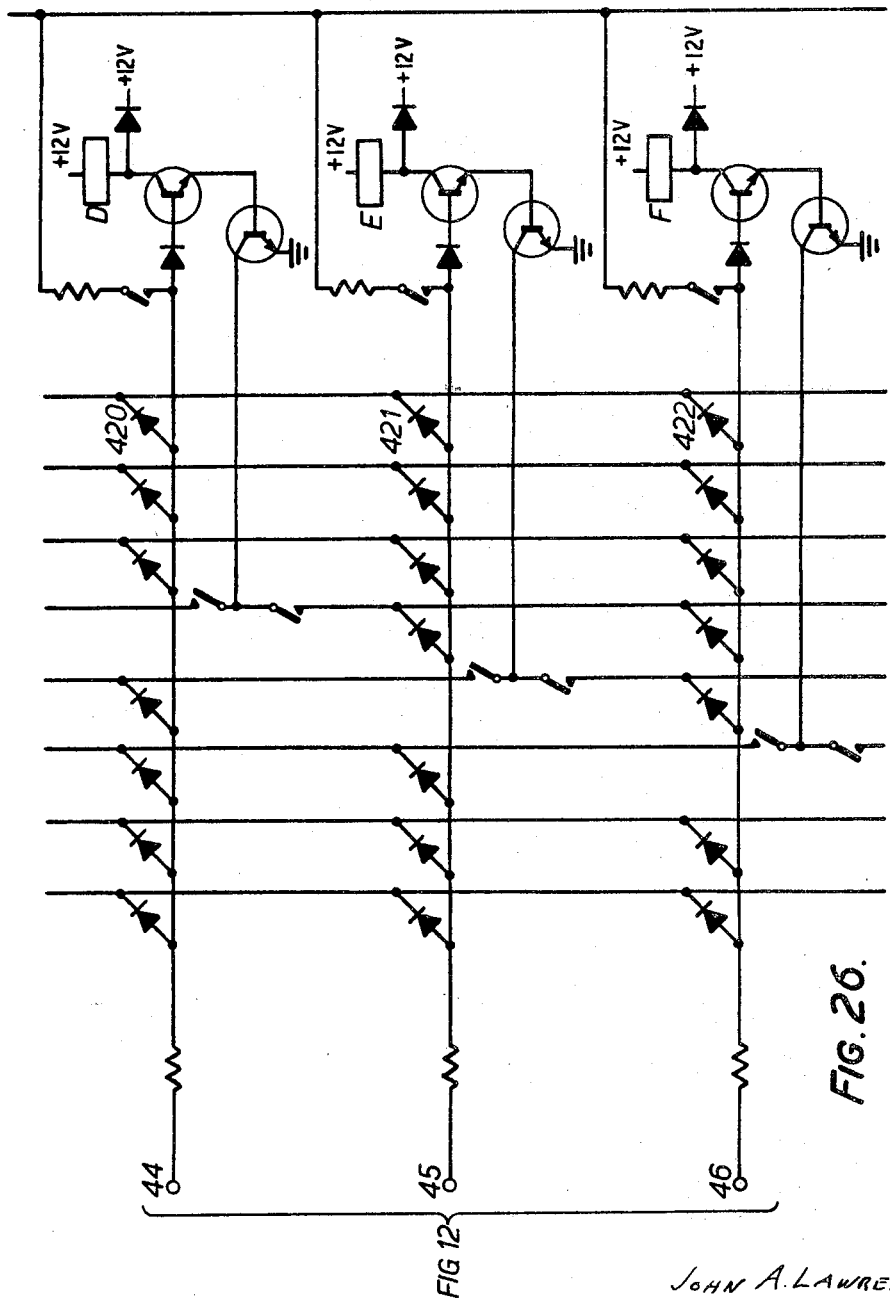
Figure 27:
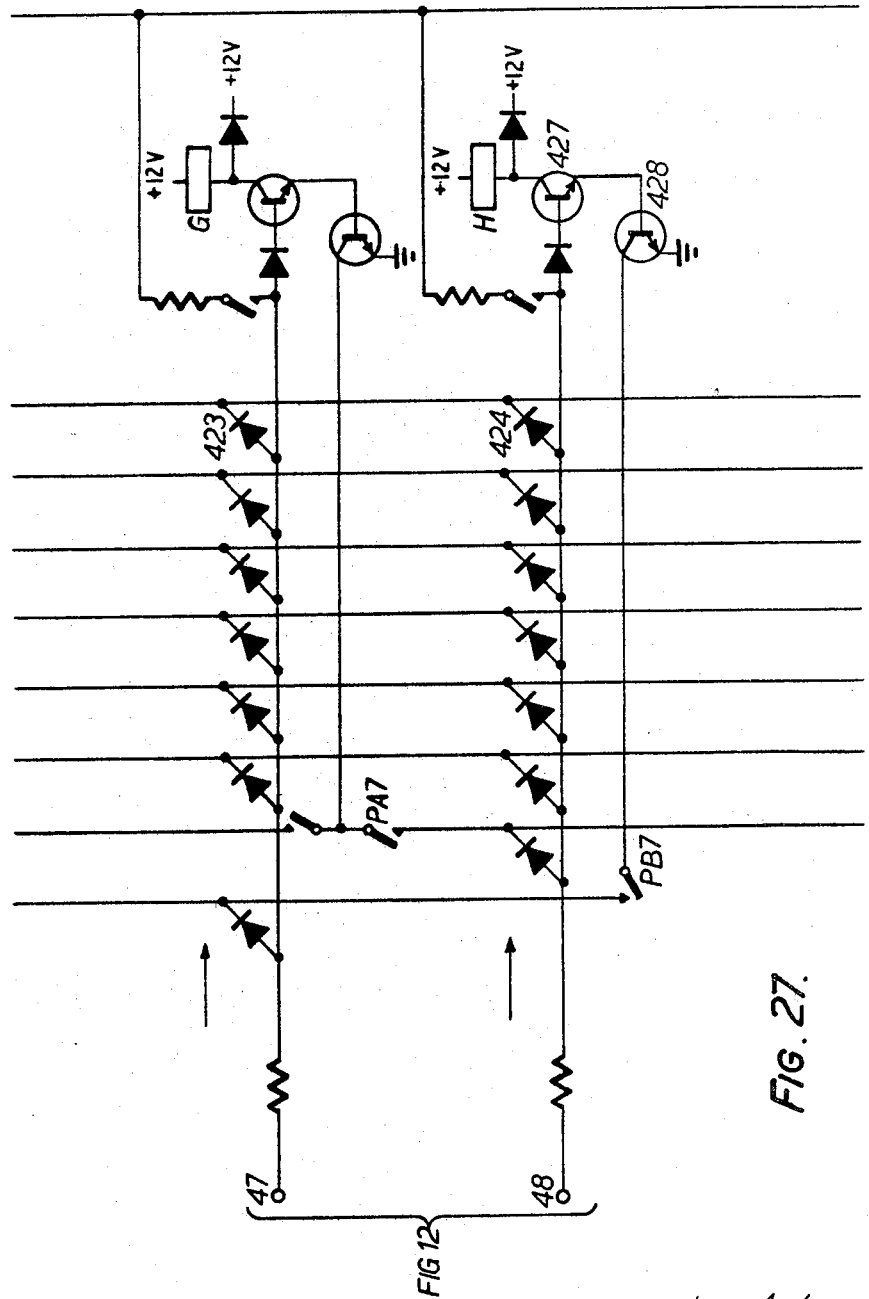

An incoming circuit 1 consisting of three leads, negative (−), positive (+) and signal (S) is connected to Register Access Unit FIG. 11 and to a particular A switch. When this circuit is calling for connection, earth is connected to the S lead and operates relay LR via diode 11 and resistor 12 to −50 volts. +12 volts is connected by operated contact LR1 to mark lead 13, which is common to 12 incoming circuits connected to one A switch. Lead 13 is connetced via lead 23 in Register Access Switch FIG. 12 to Call Isolator FIGS. 25–29, which caters for 96 circuits having 8 incoming leads 41–48 to each of which is connected a lead 23 from the Register Access Switch FIG. 12, common to 12 leads 13 FIG. 11. Leads 41–48 FIGS. 25–27 are each connected to the circuits connected to A switches A1–A8 respectively. Any number of incoming circuits may be calling for connection at the same time and it is possible for any or all of the leads 41–48 to be marked. The Call Isolator makes a selection of one of the marked leads.

*1 out of 8 selection in Call Isolator—FIGS. 25–29*

A priority of selection of leads 41–48 is provided by the pulse trigger arrangement comprising transistors 410–413 and relays PA and PB. One or other of these relays is normally operated and the trigger is changed over by means of lead 414 each time a connection is completed for a calling circuit. An alarm circuit is provided by transistors 434–437, FIG. 29, and a relay AL to provide an alarm in the event that either both relays PA and PB are energised or neither is energised. Relay AL is made slow to operate so that no alarm is obtained due to the normal overlap of relays PA and PB due to their release times. If contacts PA8 and PB8 are both operated transistors 436 and 437 are both conducting to provide an operating circuit for relay AL. Under normal conditions only one of the contacts PA8, PB8 is closed and the associated transistor is non-conducting although the other transistors will be conducting. One or other of transistors 434, 435 is rendered non-conducting by the operation of PA8 or PB8. If neither relay PA or PB operates both contacts PA8 and PB8 are open, transistors 434 and 435 conduct and relay AL is energised. Contacts AL1, AL2 apply earth to leads 438, 439 respectively to operate an alarm circuit not shown. When relay PA is operated the priority of selection is leads 41–48 in that order. When relay PB is operated the order is reversed to leads 48–41.

Figure 28:
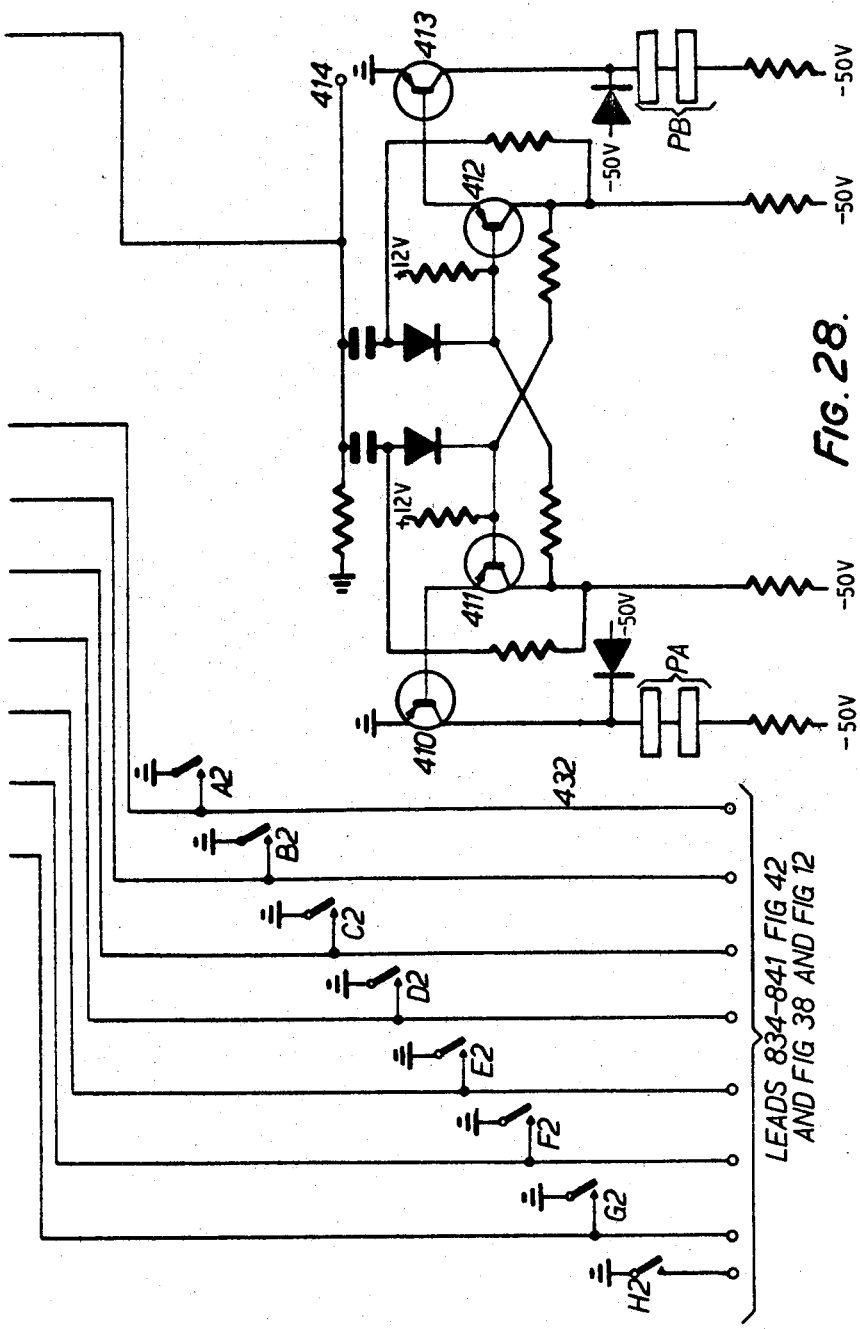

Assume that relay PA is operated, FIG. 28, and that lead 41 FIG. 25 is marked by +12 volts from lead 23, FIG. 12, due to at least one incoming circuit calling FIG. 11. Via resistor 49 and diode 415, FIG. 25, transistors 416 and 417 are turned on and relay A is operated. The collector of transistor 417 connected to operated contact PA1 inhibits all the other leads 42–48 by diodes 418–424 respectively. Marking of any of the other leads results in a similar operation. Lead 42 turns on transistors 425 and 426, operates relay B and inhibits via contact PA2. Lead 43 inhibits via contacts PA3 . . . lead 47 inhibits via contact PA7. When priority relay PB, FIG. 28, is operated the order is reversed. A mark on lead 48 FIG. 27 takes priority by turning on transistors 427 and 428, operating relay H and inhibiting through contact PB7. The relay contacts A2–G2 FIG. 28 and B3–H3 FIG. 25 are used in order to safeguard the condition when a higher priority lead is marked after a selection has been made and is still being indicated. For example, if lead 43 is marked and its relay C is operated under priority PA, and a mark is received on lead 42, earth from operated contact C3 inhibits the higher priority leads 41 and 42 through diodes 429 and 430 respectively.

Figure 29:
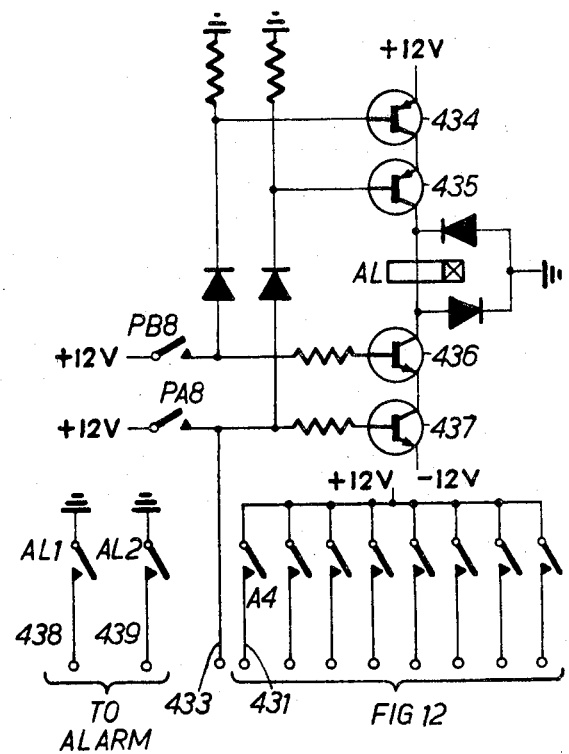

Assuming that a selection has been made for lead 41 and relay A operated, contact A4 connects +12 volts to lead 431 FIG. 29. This lead is connected to lead 24 in Register Access Switch FIG. 12, connected to lead 14 in Register Access Unit, FIG. 11. Lead 14 is common to the same 12 circuits as lead 13. The +12 volts on lead 13 via operated contact LR3, diode 16 and lead 15 individual to the calling circuit, is connected via lead 25, FIG. 12, to one of the leads 31–39 and 310–312 of the Call Isolator FIGS. 13–22. Each of these leads is common to 8 leads 15, FIG. 11 via leads 25 FIG. 12. That is, each lead has connected to it one incoming circuit from each of the A switches. Thus lead 31 has connected to it circuit 1 from each A switch, lead 32 has connected to it circuit 2 from each A switch, and lead 312 has connected to it circuit 12 from each A switch. Any or all of the leads 31–39 and 310–312 may be marked and it is necessary to make a selection of one of them.

*1 out of 12 selection in Call Isolator—FIGS. 13–24*

Figure 24:
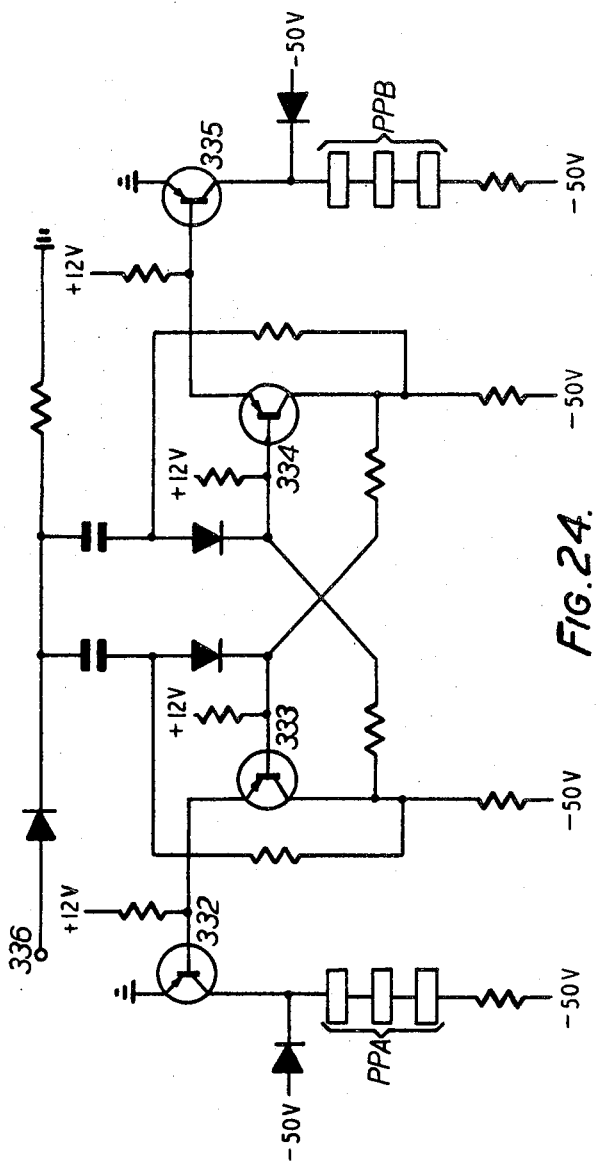

This selection is carried out in a manner similar to that already described for the 1 out of 8 selection of FIGS. 25–29, in which lead 41 was selected, denoting any of circuits 1–12 connected to A switch A1. Now assume that circuit 1 of A switch A1 is calling. +12 volts from operated contact A4 and lead 431 FIG. 29, lead 24 FIG. 12, lead 14 FIG. 11, common to the 12 circuits of A switch A1, operated contact LR3 diode 16 and lead 15 all individual to circuit 1 and lead 25 FIG. 12 is connected to lead 31 FIG. 13 and via resistor 313 and diode 314 turns on transistors 315 and 316 to operate relay J. The priority of selection as described for the 1 out of 8 selection FIGS. 25–29, apply equally in this selection circuit. The trigger circuit comprising transistors 332–335 and relays PPA and PPB FIG. 24 is normally operated in one direction or the other and changed over via lead 336. Lead 336, FIG. 24 is connected to lead 433, FIG. 29 and thus the trigger comprising transistors 332–335 changes over each time a 1 out of 8 selection is made. An alarm circuit is provided by transistors 337–340 and a relay AAL to provide an alarm in the event that either both relays PPA and PPB are energised or neither is energised. Relay AAL is made "slow to operate" so that no alarm is obtained due to the normal overlap due to their release times. If contacts PPA12 and PPB12 are both closed, transistors 339 and 340 both conduct to provide an operating circuit for relay AAL. Under normal conditions only one of the contacts PPA12, PPB12 is closed and the associated transistor is non-conducting although the other transistor will be conducting. One or other of transistors 337, 338 is rendered non-conducting by the closure of PPA12 and PPB12. If neither relay PPA or PPB operates both contacts PPA12 and PPB12 are open, transistors 337 and 338 both conduct and relay AAL is energised. Contacts AAL1 and AAL2 apply earth to leads 341 and 342 respectively to operate an alarm circuit not shown. Assuming that PPA is operated then with relay J operated, the collector of transistor 316 via operated contact PPA1 inhibits leads 32–39 and 310–312 via diodes 321–331. Contacts K2–U2 provide, under priority of PPA operated, the safeguard to inhibit higher priority leads marked after a selection has been made, and contacts J2–T3 provide the same function under priority PPB.

Having made both the 1 out of 8 and 1 out of 12 selections, a particular calling circuit has been selected for connection and must be connected to the Register.

*Selected Calling Circuit to Register*

The 1 out of 8 selection FIGS. 25–29 resulted in the operation of relay A. Operated contact A2 FIG. 28 connects earth to lead 432 to lead 21 in the Register Access Switch FIG. 12, this lead being common to the 12 circuits of A switch A1. The 1 out of 12 selection of FIGS. 13–24 resulted in the operation of relay J. Operated contact J3 FIG. 23 connects +12 volts to lead 317 connected to individual lead 22 of Register Access Switch FIG. 12, appropriate to circuit 1 of A switch A1. Leads 21 and 22 are connected to the operating coil XA1 of the cross-point for this circuit. Coil XA1 is energised to close the crosspoint to connect the calling circuit's leads —, + and S from the Register Access Unit FIG. 11 through Register Access Switch FIG. 12 to the Register FIG. 32.

*Seizure of Register—FIGS. 30–35*

The condition of calling incoming circuit FIG. 11 was earth on lead S to operate relay LR. This earth now operates relay BB FIG. 34. Operated contact BB1 connects −50 volts to lead −50 volts $s$ i.e. switched supply, contact BB2 connects +12 volts to lead +12 volts $s$ and contact BB3 connects +12 volts to lead 51 which is connected to lead 314 FIG. 20 and lead 414 FIG. 28 to provide hold circuits for operated relays in the series J . . . U FIGS. 16 and 20 and A–H FIGS. 25–27. The +12 volts $s$ supply connected to resistor 52 FIG. 32 is connected via diode 53 to the + lead and via diode 54 to the − lead, this constituting the "proceed-to-send" signal. The +12 volts $s$ via diodes 53 and 54 is also connected via resistors 55 and 56 and diodes 57 and 58 to turn on transistor 59, thereby turning on transistor 510 and operating relay CP. 4-stage detector circuit FIGS. 30 and 31, and operated contact CP4 connects the − lead to a 3-stage detector, circuit FIGS. 33 and 34. The +12 volts $s$ "proceed-to-send" signal sent on the + and − leads goes back via the Register Access Switch, FIG. 12, and the Register Access Unit FIG. 11 to the calling circuit as a signal that the Register is ready to receive information. The Register is arranged to store digital information indicative of the required outgoing route from the B switch. This is received over the + and − leads by D.C. signalling. A digit is characterised by the combination of a 1 out of 4 potential gradient in each of the + and − leads. 1 out of 4 on each lead provides 16 discrete signals, but in this embodiment 10 digits only are catered for and FIGS. 33 and 34 show three stages only.

*Storage in Register—FIGS. 30–35*

Figure 30:
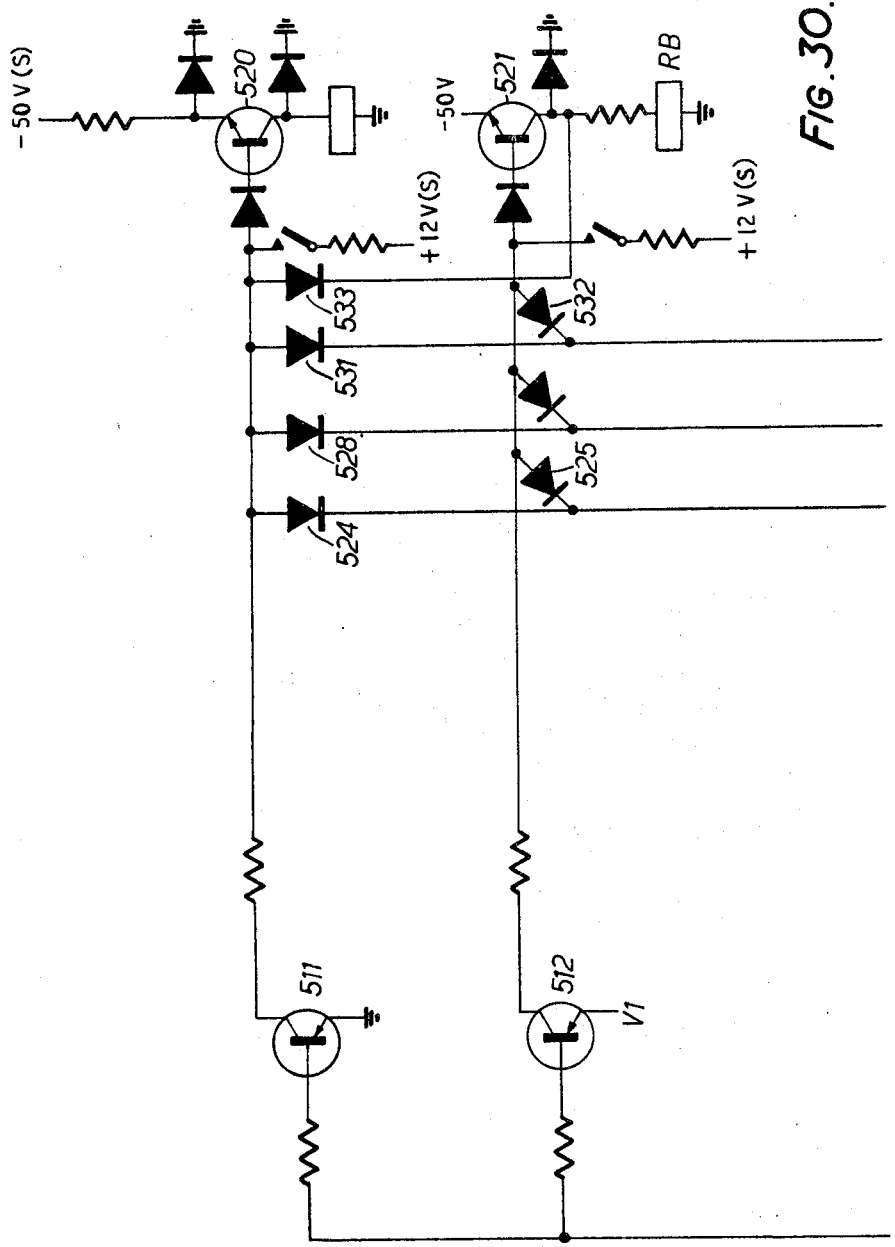
Figure 31:
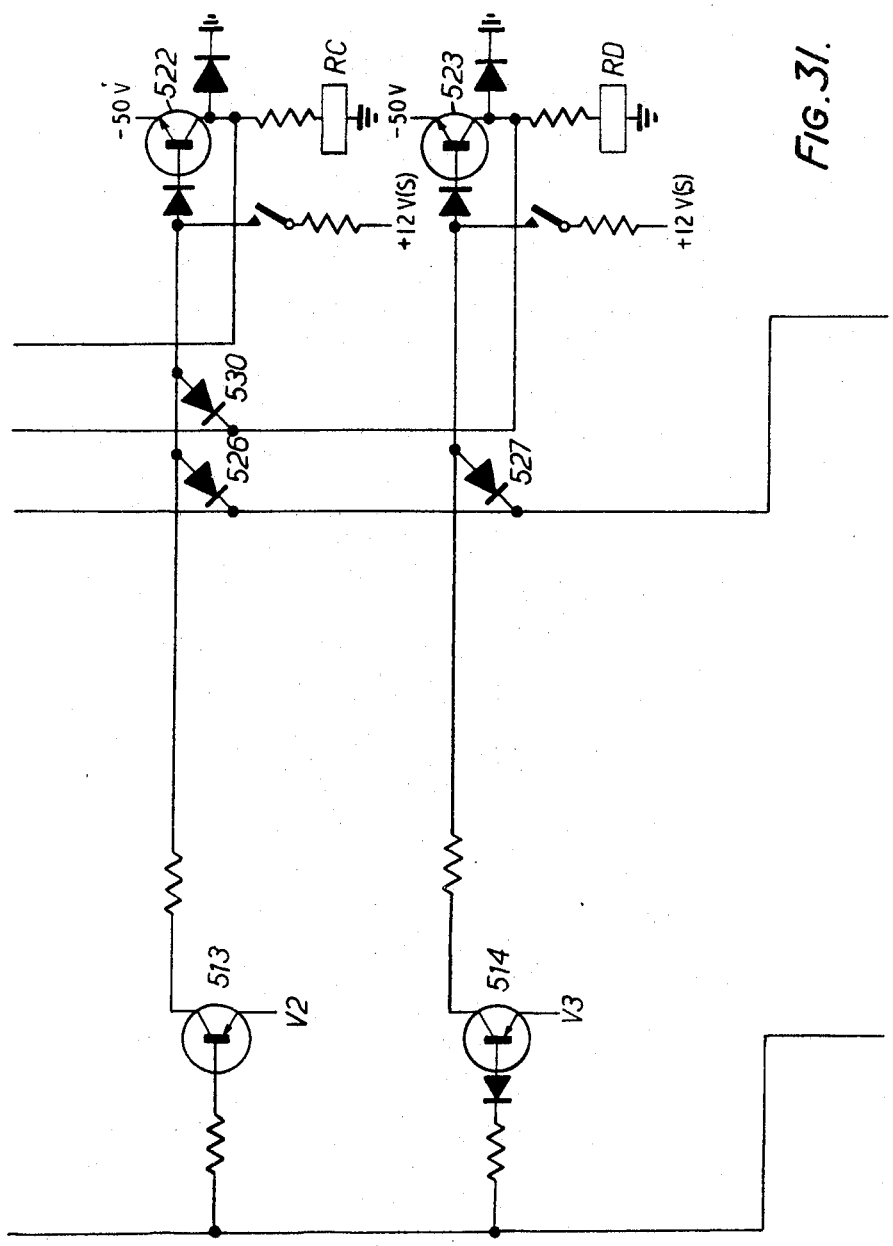
Figure 32:
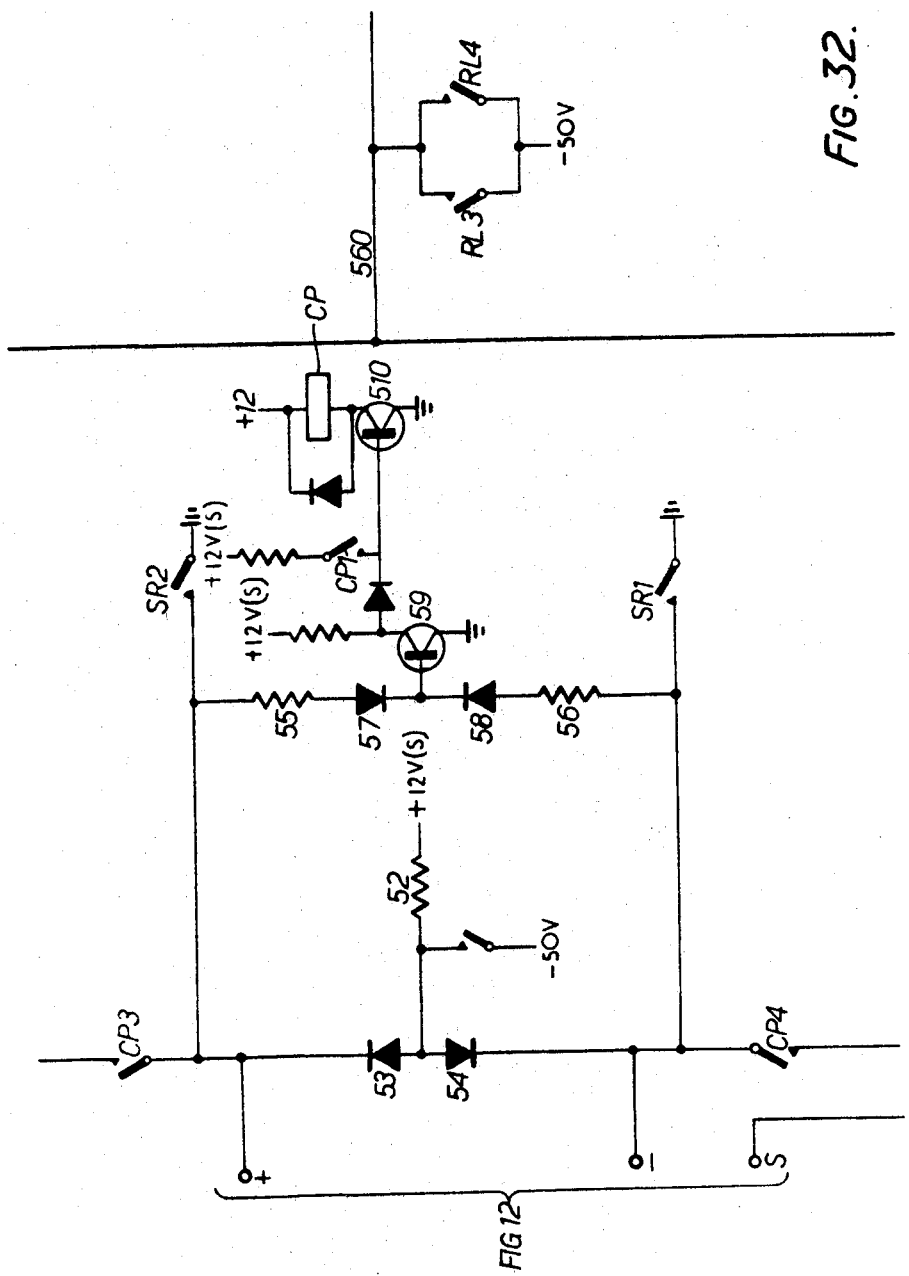
Figure 33:
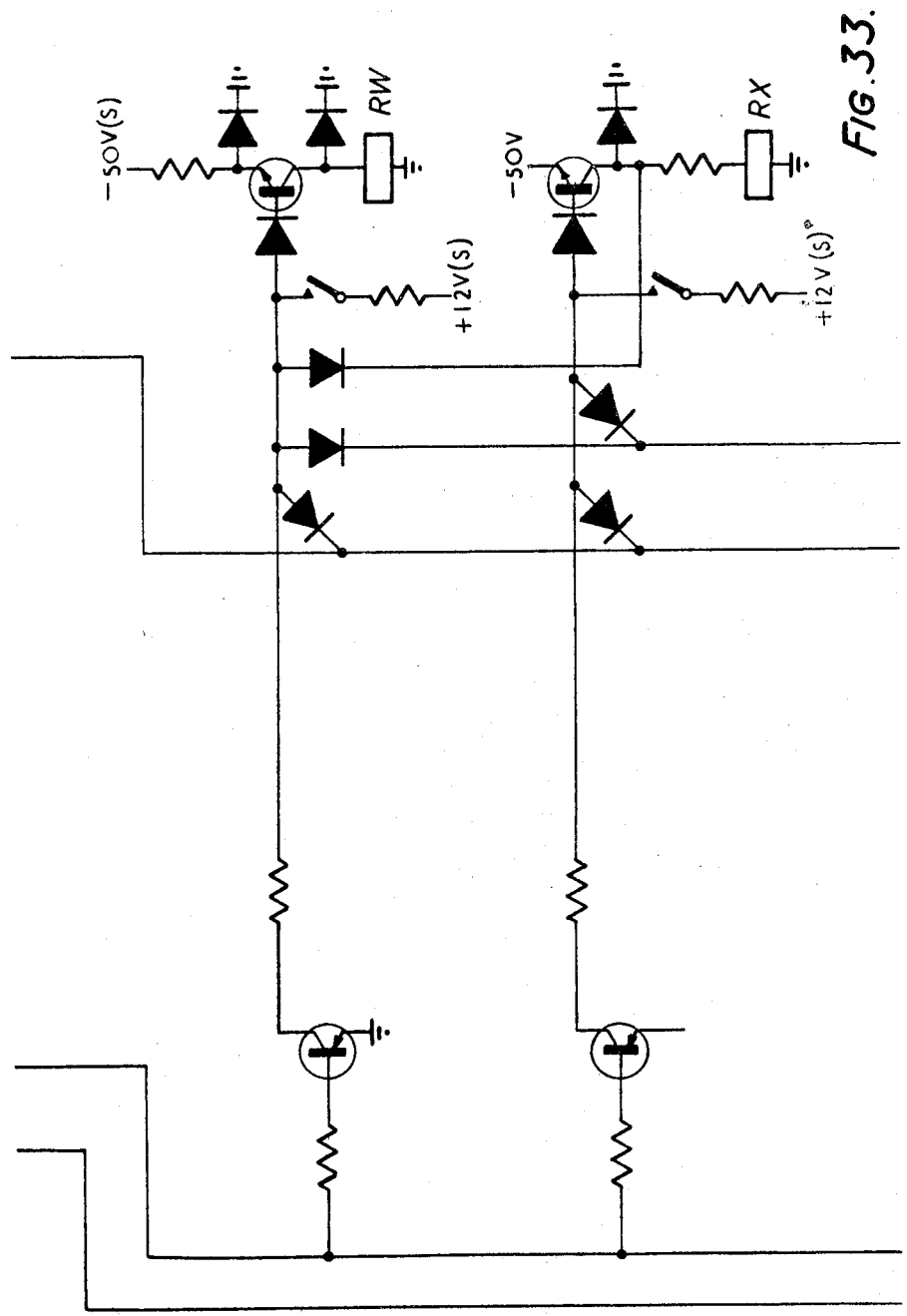
Figure 34:
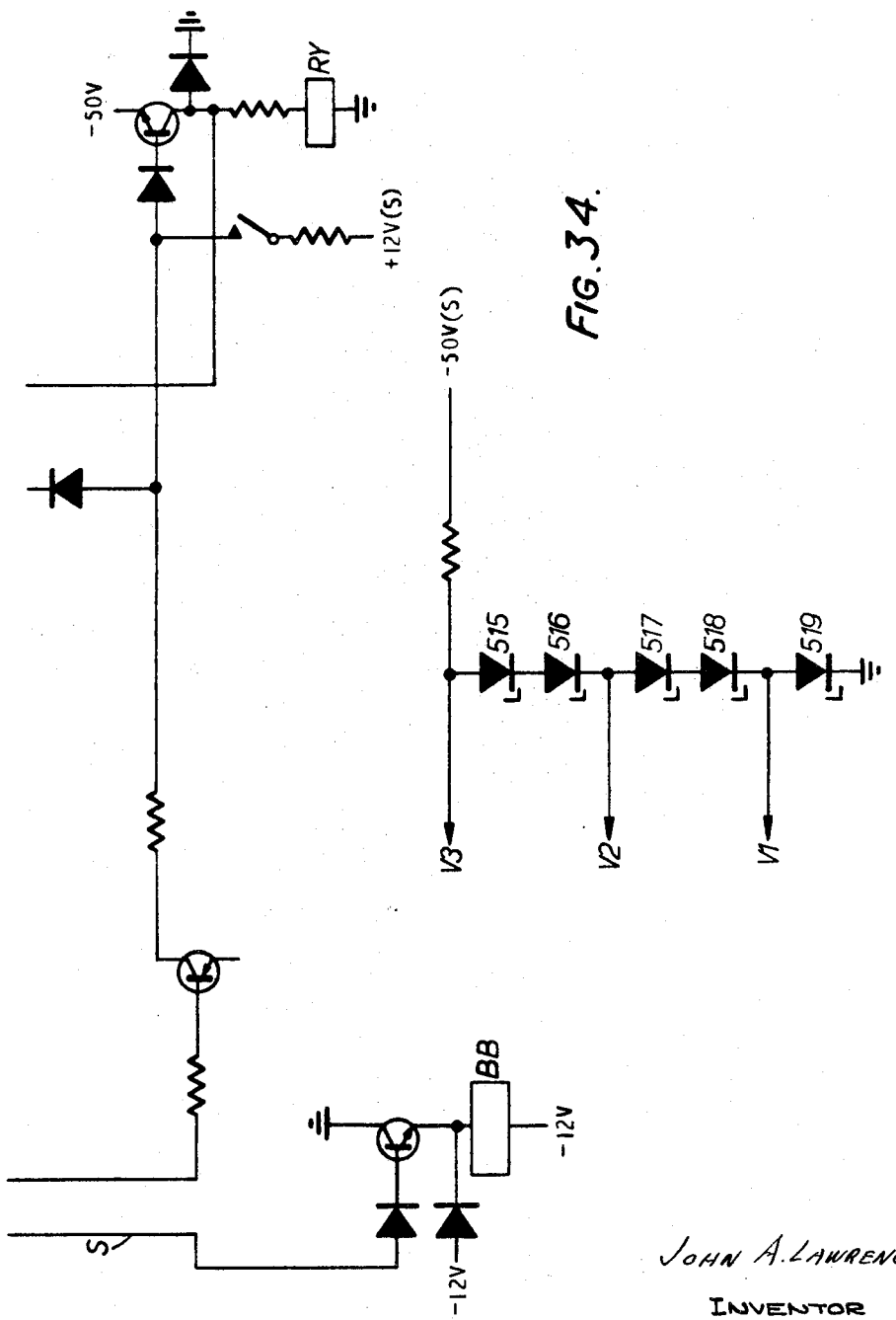

The operation of the detector circuit FIG. 33 or 34 connected to the − lead is similar to that of the detector circuit FIGS. 30 and 31 connected to the + lead and in this description the operation is described only in relation to FIGS. 30 and 31. It will be seen that the emitter of transistor 511 is connected to earth, that of 512 to a potential V1, that of 513 to a potential V2, and that of 514 to a potential V3. Potentials V1, V2 and V3 are obtained from a Zener diode chain 515–519, FIG. 34. The four potential gradients that may be received in combination over the +ve and − leads in order to designate digital information are such that signal 1 turns on transistor 511 only, signal 2 turns on transistors 511 and 512, signal 3 turns on 511, 512 and 513 and signal 4 turns on 511, 512, 513 and 514. If transistor 511 is turned on it turns on transistor 52 to operate relay RA, 512 turns on 521 to operate relay RB, 513 turns on 522 to operate relay RC and 514 turns on 523 to operate relay RD. Due to the diode matrix 524–533 the highest-numbered transistor in the series 520–523 inhibits all lower-numbered transistors and hence for any one of the received signal potentials, one only of transistors 520–523 will remain turned on and its associated relay operated. It will be appreciated that the operating time of a relay is a matter of milliseconds and is so much greater than that of a transistor, that although more than one transistor in the series may be turned on initially, those, with the exception of the highest-numbered, will be inhibited and turned off before their associated relays have been operated. For example, if transistors 520, 521 and 522 are turned on due to signal 3 being received, transistor 522 inhibits 521 via diode 532 and 520 via diode 531 so that only 522 will remain turned on and its associated relay RD will be operated.

Figure 35:
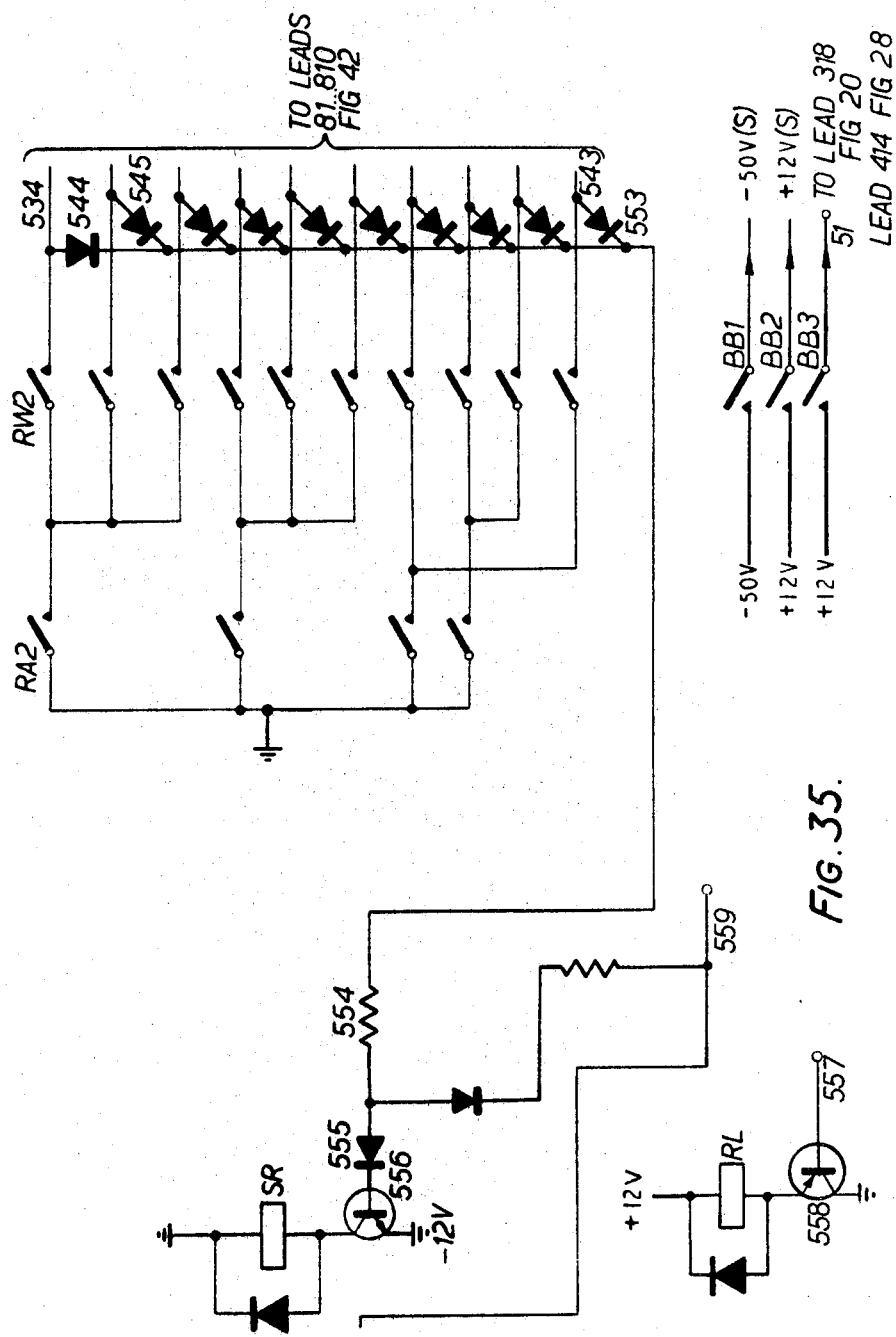
Figure 36:
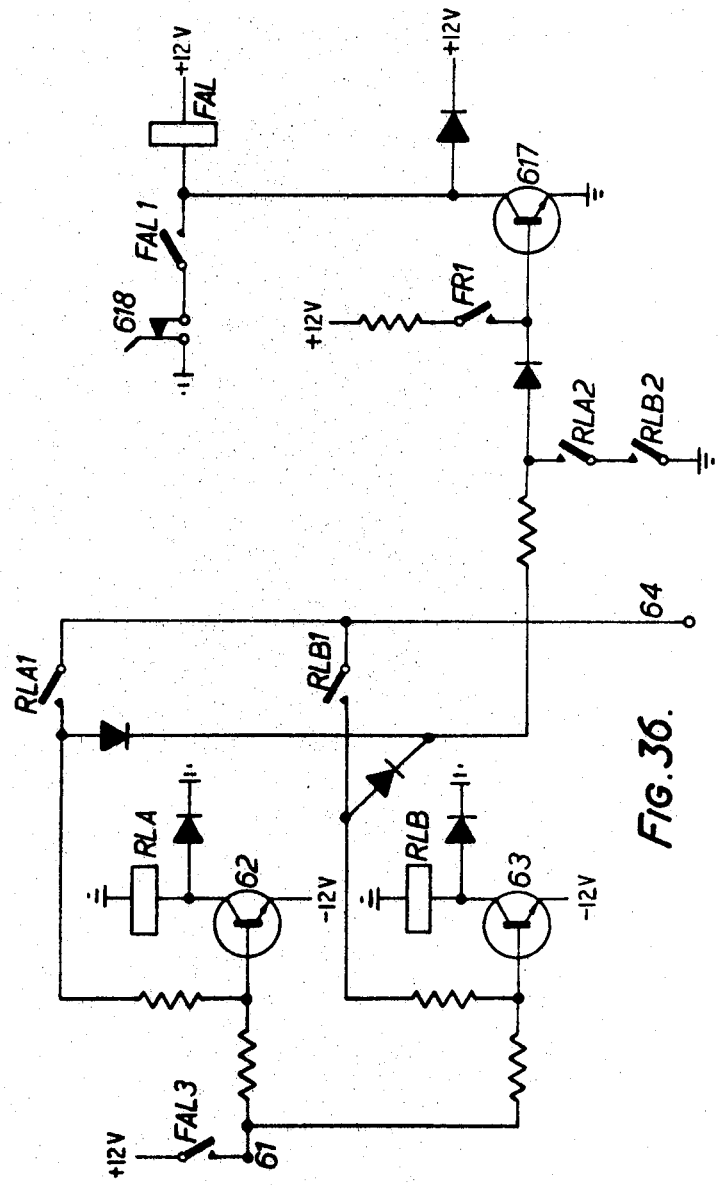
Figure 37:
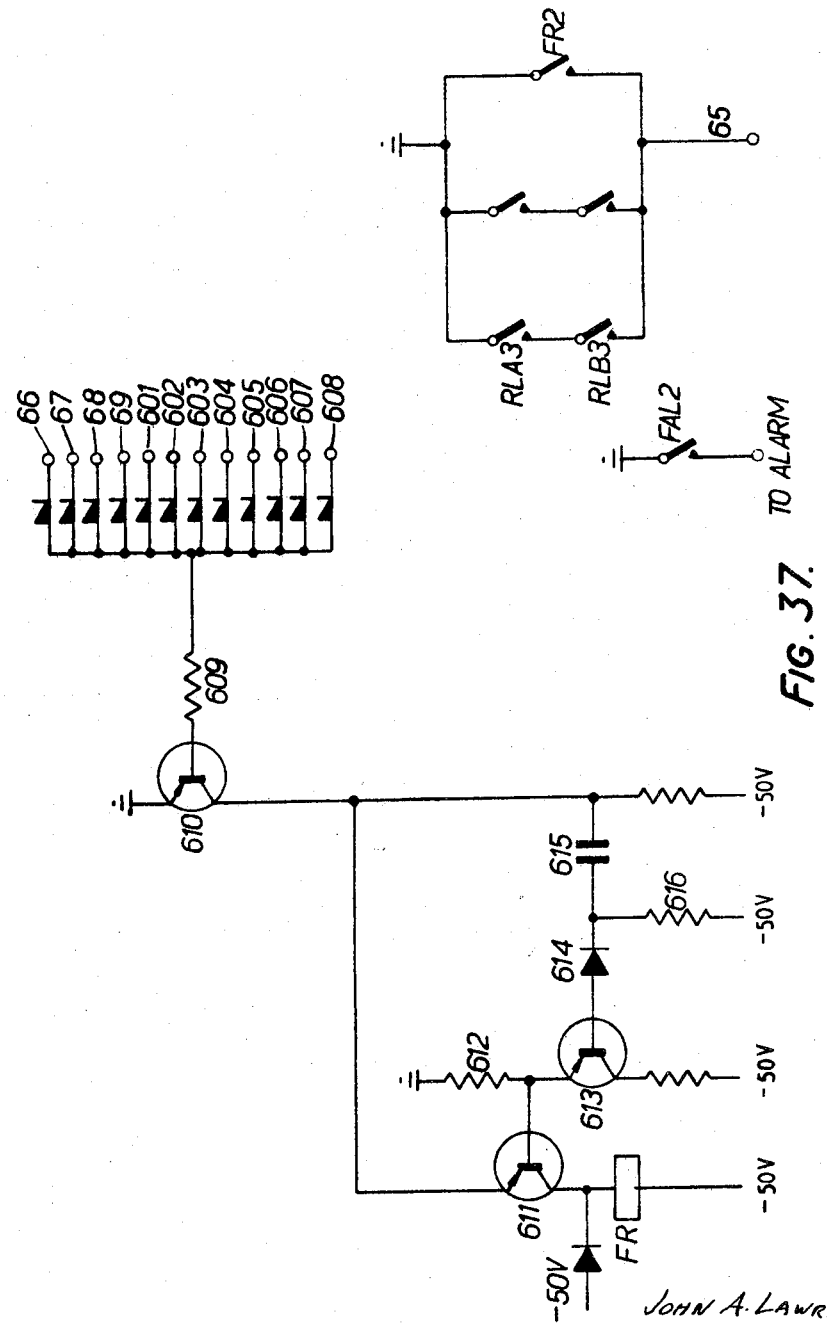
Figure 38:
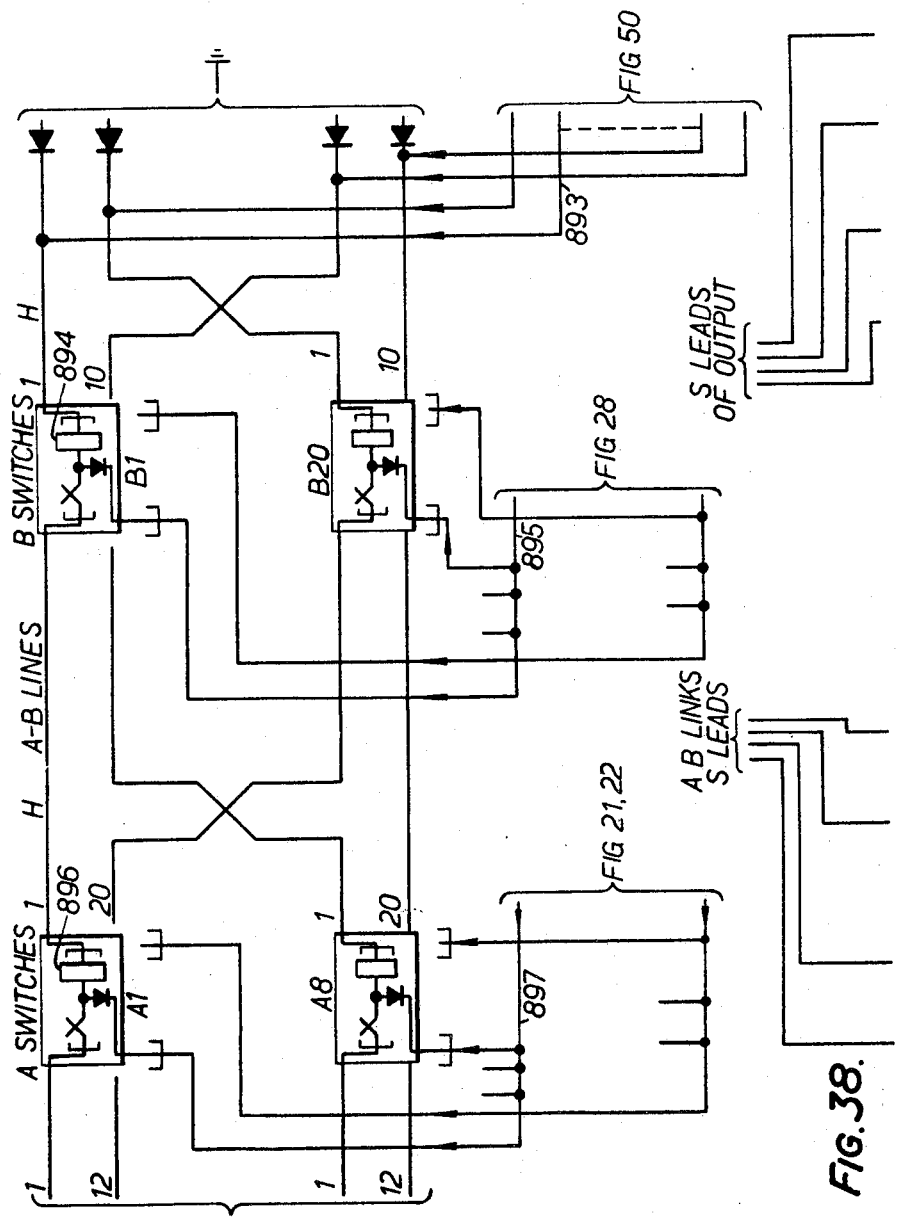
Figure 39:
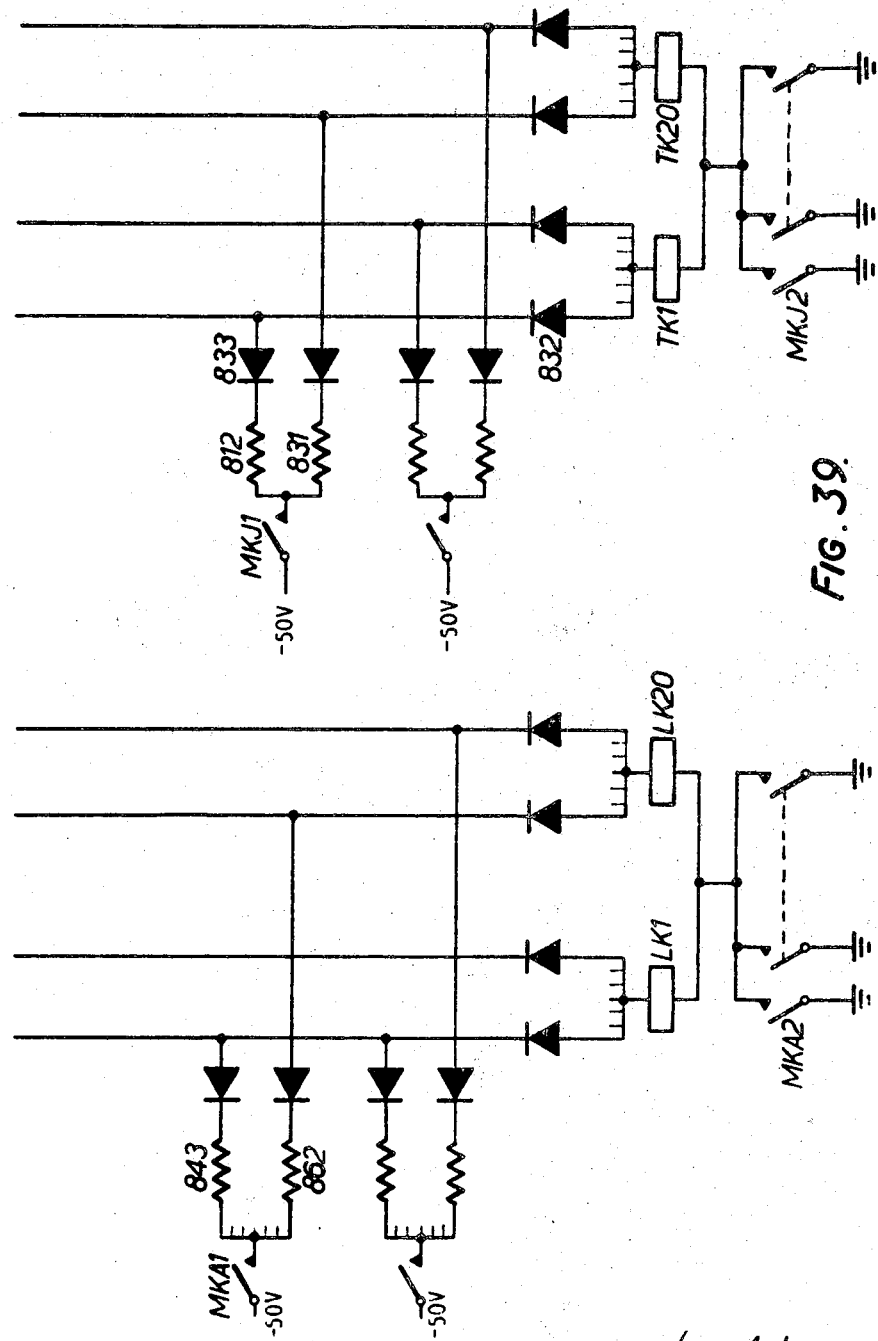

As the result of the signals received over the + and − leads, one relay will be operated in the + lead detector circuit RA–RD FIGS. 30 and 31 and one relay will be operated in the − lead detector circuit RW–RY FIGS. 33 and 34. The combination of these two operated relays causes the appropriate outgoing lead of leads 534–543 FIG. 5 representing digit values 1–0 to be marked by earth. For example, operated contacts RA2 and RW2 mark lead 534 representative of the received digit 1. Earth on any one of the leads 534–543 via the associated diode of the series 544–553 and via resistor 554 and diode 555 turns on transistor 556 to operate relay SR. Operated contacts SR1 and SR2 connect earth to the + and − leads respectively, back through the Register Access Switch FIG. 12 and Register Access Unit FIG. 11 to the calling circuit, as a "signal detected" signal. The outgoing leads 534–543 FIG. 35 are connected to incoming leads 81–89 and 812 of the Route Interrogator FIG. 42.

*Selection of free output circuit in Route Interrogator— FIGS. 38–42*

If the digit 1 has been received and stored by the Register as already explained, lead 81 FIG. 42 is marked by earth. This turns on transistor 811 and operates relay MKJ. Operated contact MKJ1 connects −50 volts to the common of 20 resistors 812–831 and operated contact MKJ2 connects earth to the common of relays TK1–10, FIG. 39. These relays are common to the 10 outgoing routes and are provided on the basis of one relay per output, each relay being associated with a different one of the B switches B1–B20. With relay MKJ operated, an operating circuit is prepared for each of the relays TK1–20. Each relay is also connected from a point between diodes such as 832 and 833 to the lead S of its output on the associated B switch. When an output is engaged, an earth from the B switch to which that output is joined is connected to the lead S and this shunts the associated relay TK to prevent its operation. Therefore as many TK relays will be operated as there are free outputs in the designated route. Contacts 4 of the operated TK relays connect −50 volts to lead 898, FIG. 40, which is connected to lead 559, FIG. 35, to release relay SR whose contacts SR1, SR2 remove earth constituting the "signal detected" signal from the − and + leads in the register, FIG. 32, and release the detector circuits FIGS. 30 and 31, and 33, 34.

It is now necessary to find an AB link that is free between the A switch to which the calling circuit is connected and any one of the marked free outputs. This selection is made in the Link Interrogator.

*Selection of free AB link in Link Interrogator— FIGS. 38–42*

As a result of the 1 out of 8 selection in the Call Isolator FIGS. 25–29 in which A switch A1 was selected, lead 834 FIG. 42 will be marked by earth from lead 432 FIG. 28, causing transistor 842 to be turned on and relay MKA to be operated. Operated contact MKA1 connects −50 volts to the common of 20 resistors 843–862 FIG. 39 and operated contact MKA2 connects earth to the common of relays LK1–20, thus preparing an operate circuit for each relay LK. These relays are common to A switches A1–A8 and are provided on the basis of one relay per AB link, each relay being associated with a different A switch. Each relay LK is also connected to the lead S of its associated AB link, on which an earth appears from the B switch to which the AB link is connected when the link is engaged. Thus, earth shunts the relay LK to prevent its operation. As many relays LK will be operated as there are free AB links. Some or all of the free links however, may not be usable for making the required connection, because they do not terminate on B switches that have free outputs marked in the designated route. It is necessary therefore to first select from the free AB links, those that are suitable for making the connection. This means comparing the operated relays TK and LK and considering only those that are mutually free, i.e. TK1 and LK1 both free. If all outputs of the designated route are free and all AB links are free, then a selection is made out of 20. This is done in two stages, a 1 out of 5 selection, followed by a 1 out of 4 selection. In the 1 out of 5 selection contacts of the mutually free relays are connected in series, such as LK1/1 and TK1/1 . . . LK20/1 and TK20/1, FIG. 40. All of the LK contacts are common to +12 volts, while the TK contacts are grouped in commons of four each, giving five sets such as TK1/1 to TK4/1 commoned to lead 863, to LK17/1 to LK20/1 commoned to lead 867. The five leads 863–867 are connected to leads 101–105 FIG. 46.

Figure 47:
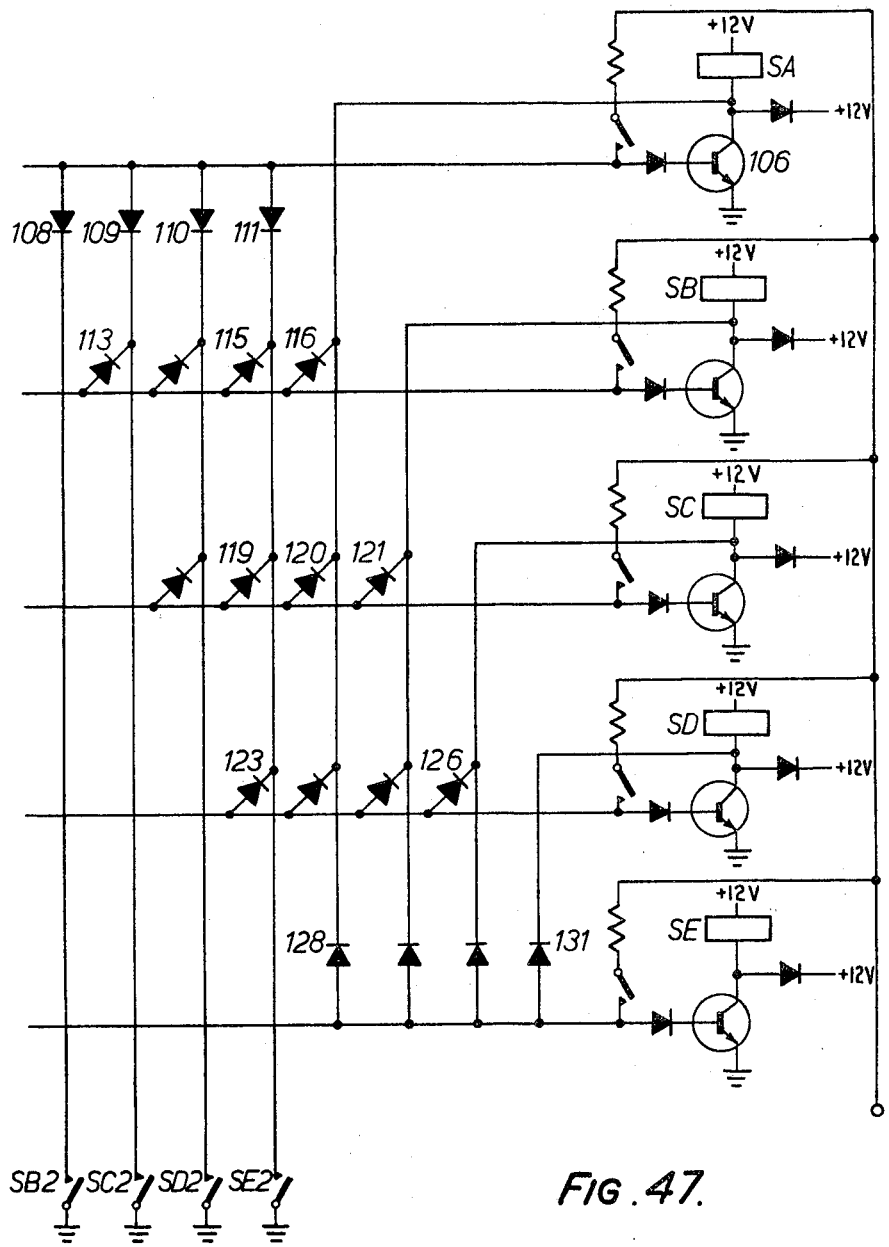

*1 out of 5 selection—FIGS. 46 and 47*

Figure 40:
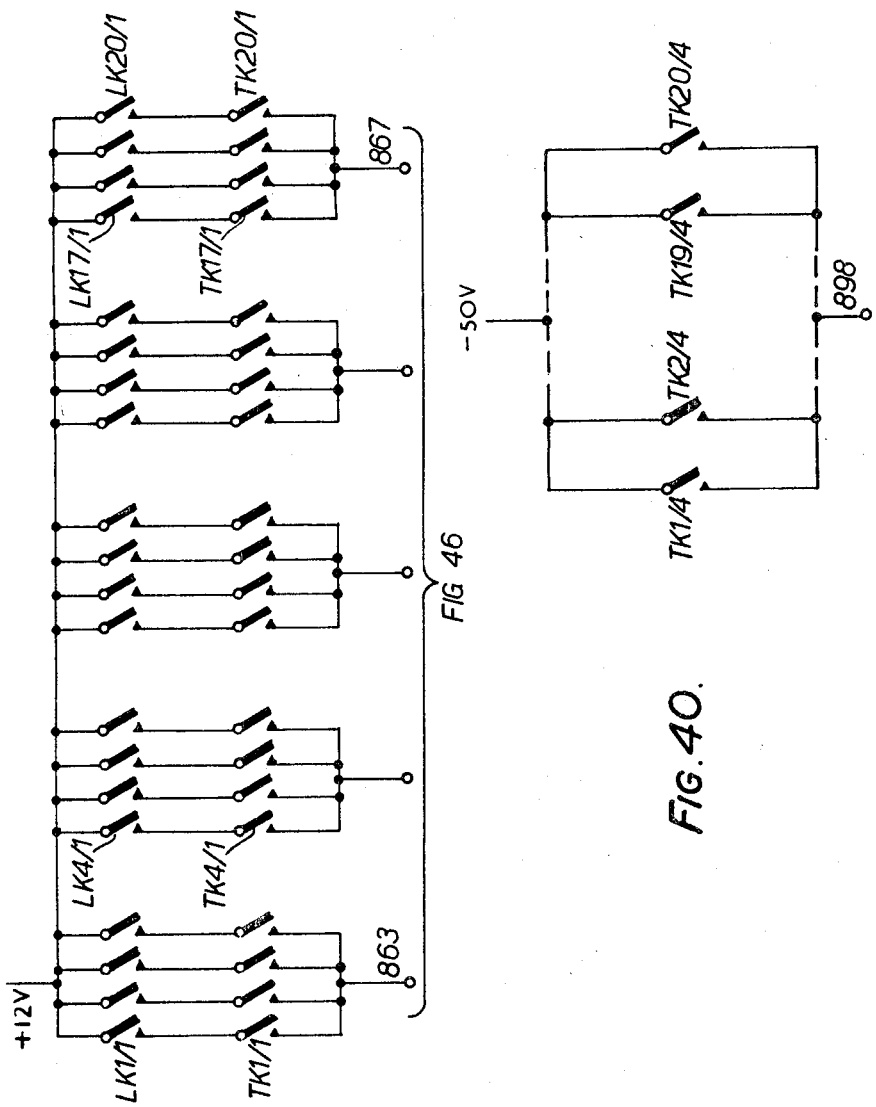
Figure 41:
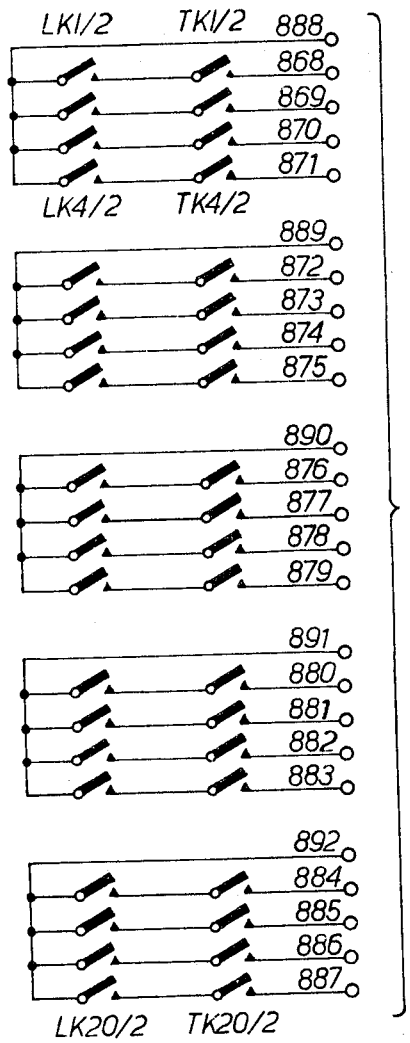
Figure 43:
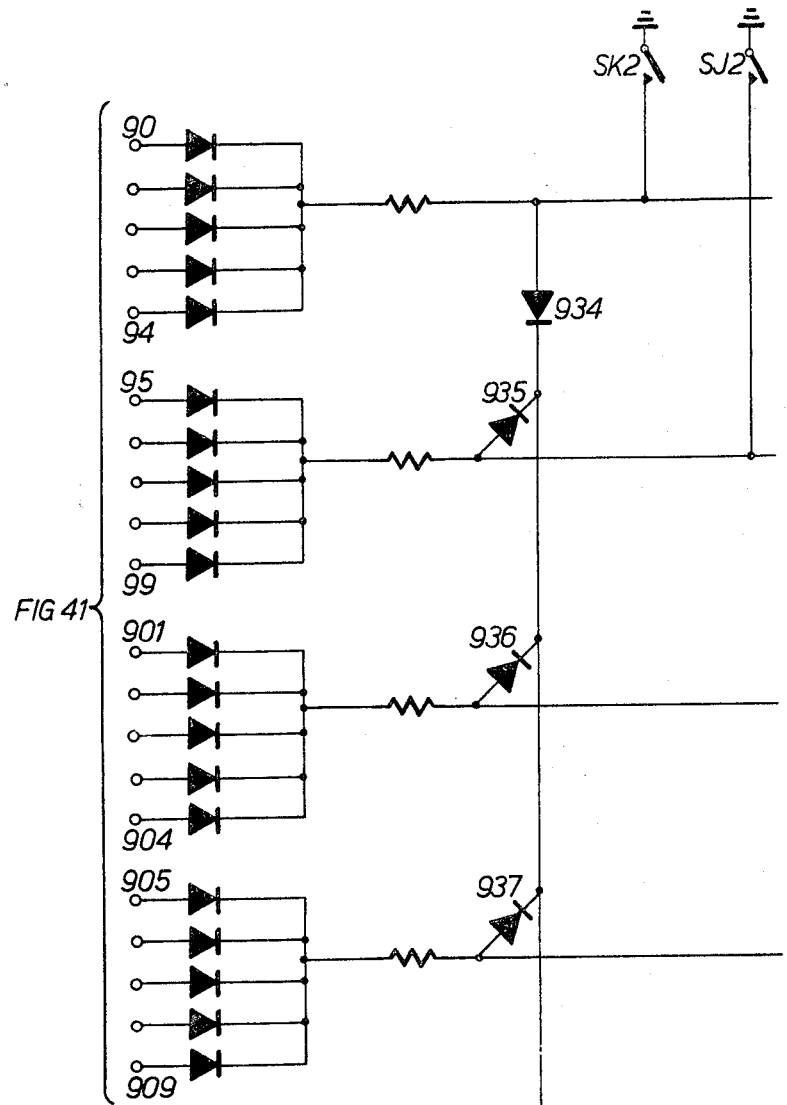

Any or all of the leads 101–105 may be marked by +12 volts from leads 863–867 FIG. 40. Preference is given to the lower numbered lead in the leads 101–105 in that the lower numbered lead inhibits all higher numbered leads. For example, if lead 101 is marked, transistor 106 is turned on and relay SA is operated. The higher numbered leads 102–105 are inhibited by diodes 116, 120, 124 and 128 respectively. Contacts SB2, SC2, SD2 and SE2 provide earth to inhibit higher priority leads if they are marked after a lower priority lead has its relay operated. For example if relay SE is operated, contact SE2 inhibits relays SA, SB, SC and SD via diodes 111, 115, 119 and 123 respectively. The selection is indicated by the operated relay connecting +12 volts to one of the leads 132–136 FIG. 46, such that if relay SA is operated, contact SA4 marks lead 132. Leads 132–136 are connected to leads 888–892 respectively in FIG. 41. Each of the five leads 883–892 is common to four LK contacts such as LK1/2 to LK4/2 connected to lead 888. Each LK contact is joined in series with its equivalent TK contact such as LK1/2 and TK1/2 connected to lead 868. The TK contacts TK1/2–TK20/2 are joined to leads 868–887 which are connected to leads 90–99 and 901–909 FIG. 43. These leads are commoned to form four groups of five each in such a manner that a group consists of one lead from each of the five groups of FIG. 41. Leads 90–94 FIG. 43 are connected to leads 868, 872, 876, 880 and 884 FIG. 41. Leads 95–99 take 869, 873, 877, 881 and 885. Leads 901–904 take 870, 874, 878, 882 and 886 and leads 905–909 take 871, 875, 879, 883 and 887.

Having made the 1 out of 5 selection in FIGS. 46 and 47 one of the leads 131–136 FIG. 46 is marked. Assuming it is lead 132, then +12 volts is connected to lead 888 FIG. 41 and dependent on operated contacts of relays LK and TK can appear on any or all of the leads 868–871 and thus on leads 90, 95, 901 and 905 FIG. 43.

Figure 44:
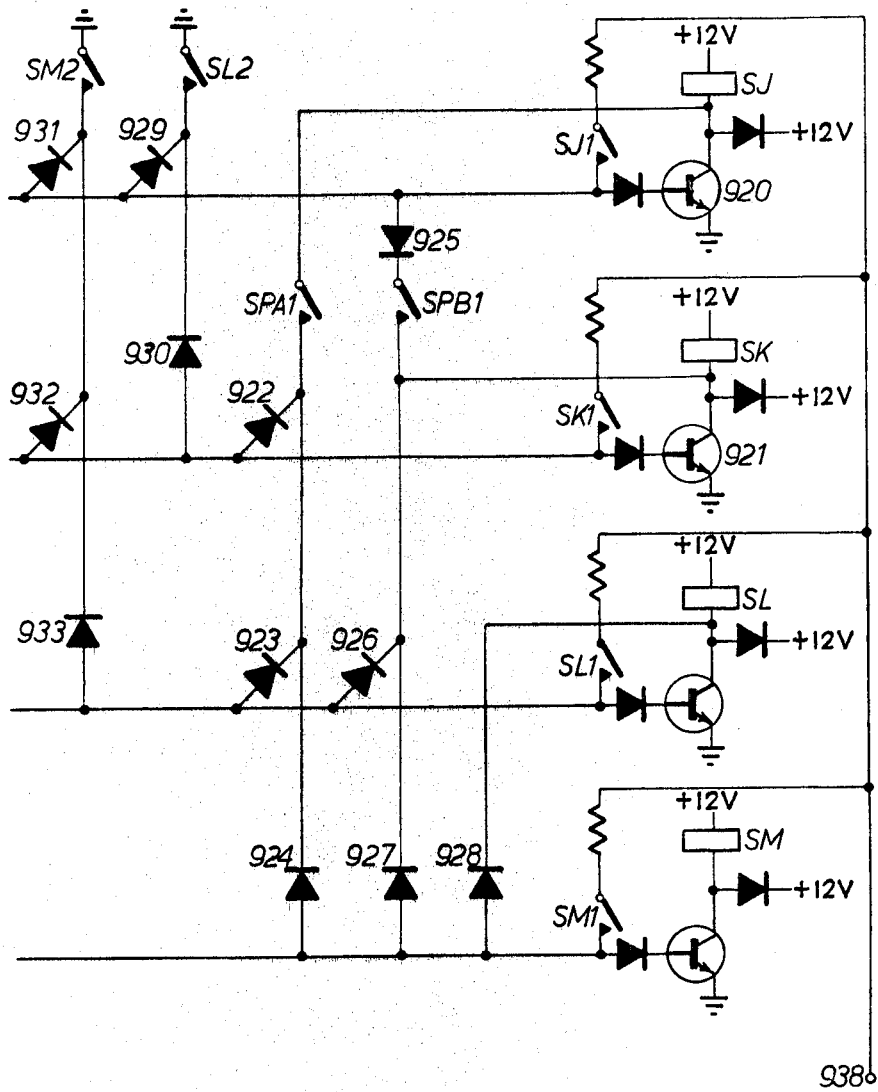
Figure 45:
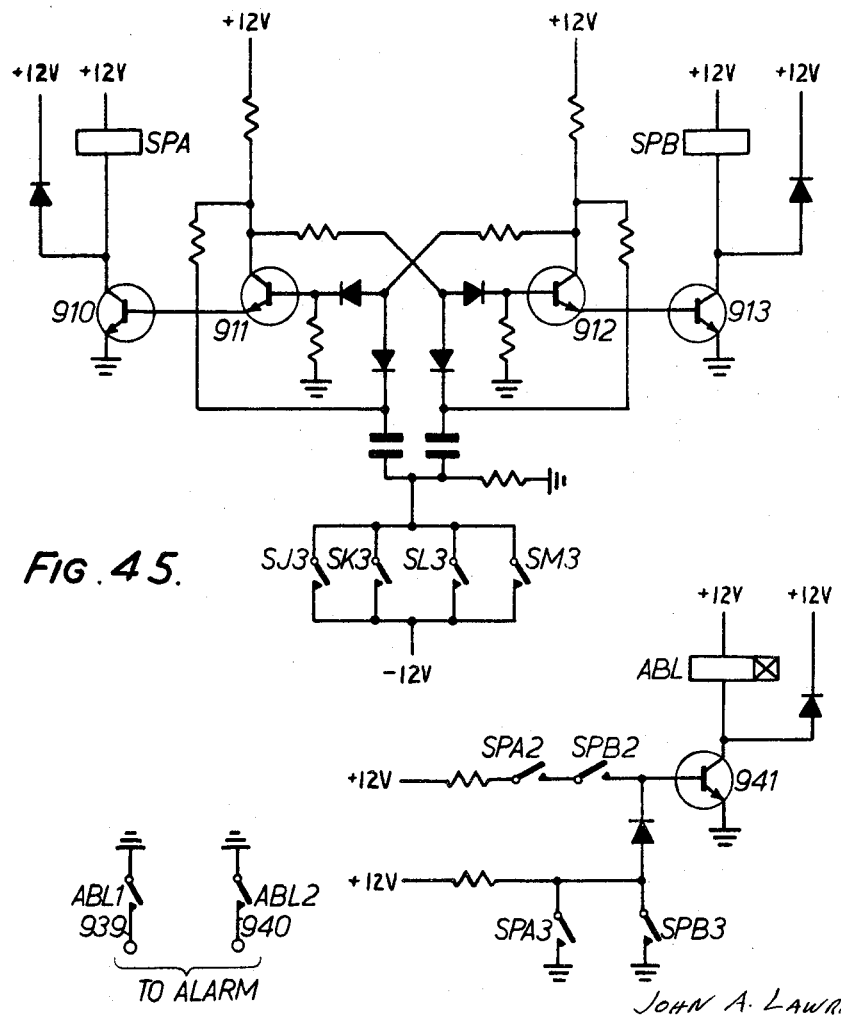

*1 out of 4 selection—FIGS. 43–45*

Priority of selection between relays SJ and SK is provided by the trigger circuit comprising transistors 910–913 and relays SPA and SPB, one or other of which will normally be operated. An alarm circuit is provided by transistor 941 and relay ABL to provide an alarm in the event that either both relays SPA, SPB are energised or neither is energised. Relay ABL is made "slow to operate" so that no alarm is obtained due to the normal overlap of relays SPA, SPB because of their release times. If contacts SPA2 and SPB2 are closed, transistor 941 conducts and relay ABL is energised. Under normal conditions only one of the contacts SPA2, SPB2 is closed, the other being open so transistor 941 is nonconducting. If neither relay SPA, SPB is energised, contacts SPA3, SPB3 are open and +12 volts is applied to render transistor 941 conducting and operates relay ABL. Normally either SPA3 or SPB3 is closed and the +12 volt source is short-circuited. Contacts ABL1 and ABL2 apply earth to leads 939, 940 respectively to operate an alarm circuit not shown. Any or all of the leads 90, 95, 901 and 905 may be marked. If SPA is operated, preference is given to relay SJ. For example, if lead 90 is marked transistor 920 is turned on to operate relay SJ. The higher numbered leads are inhibited by diodes 922, 923 and 924 respectively via contact SPA1. A mark on lead 95 turns on transistor 921 and operates relay SK. This inhibits relay SL or SM via diodes 926 and 927 respectively. If lead 95 is marked when SPB is operated however, the operation of relay SK inhibits relay SJ via contact SPB1 and relays SL and SM via diodes 926 and 927 as before. Contacts SJ2, SK2, SL2 and SM2 provide the safeguard condition if a higher-priority lead is marked after a lower-priority lead has its relay operated. The selected relay turns on a transistor to mark its output lead, thus operated contact SJ4 turns on transistor 914 to mark lead 915 of the four leads 915–918, FIG. 45. These leads are connected to leads 1100–1103 in the Output Circuit Marker FIGS. 48–50.

Figure 50:
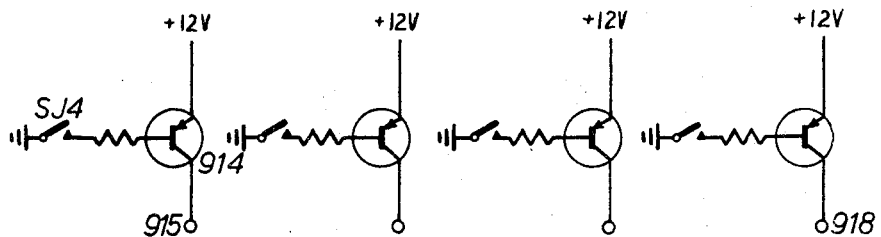
Figure 48:
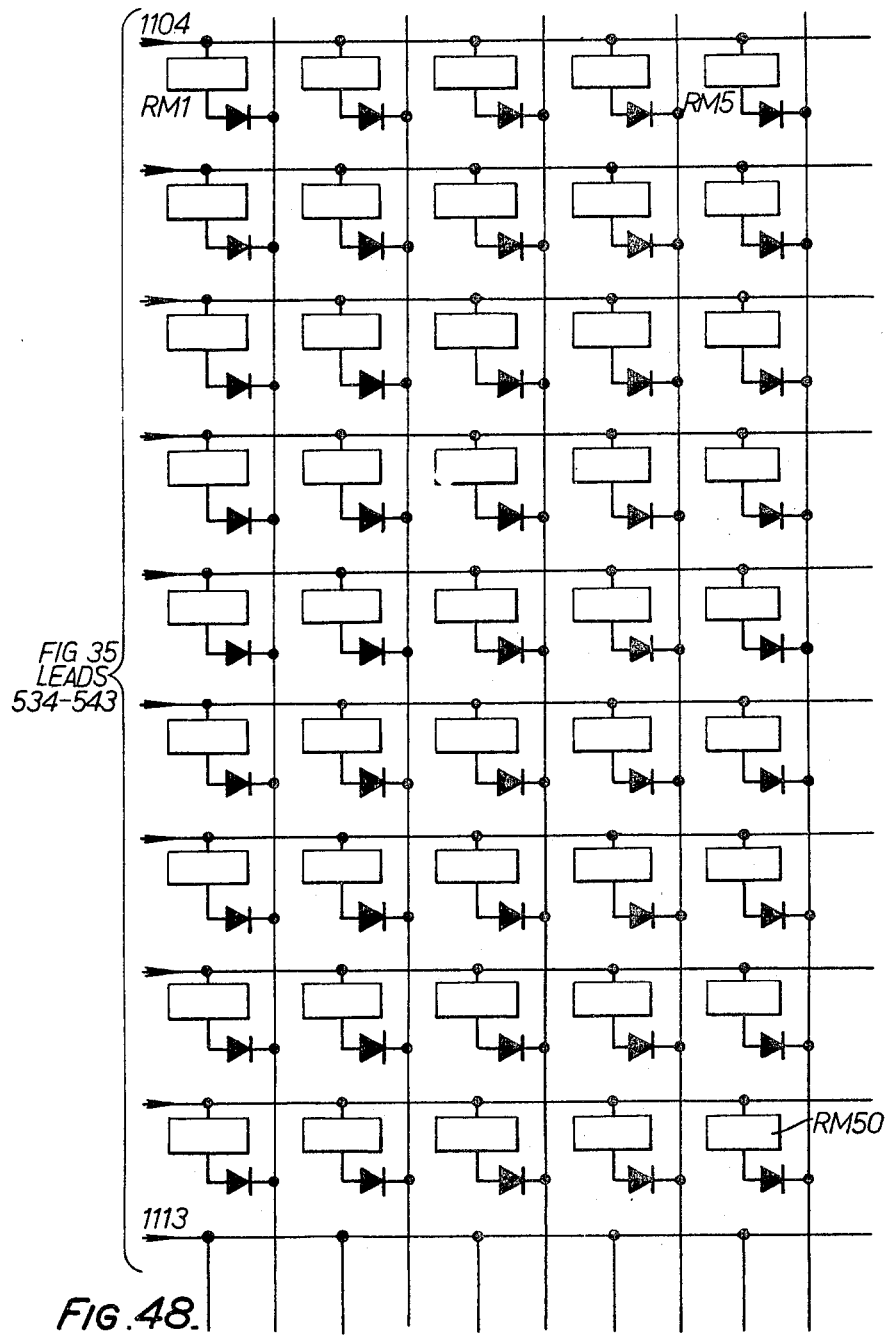
Figure 49:
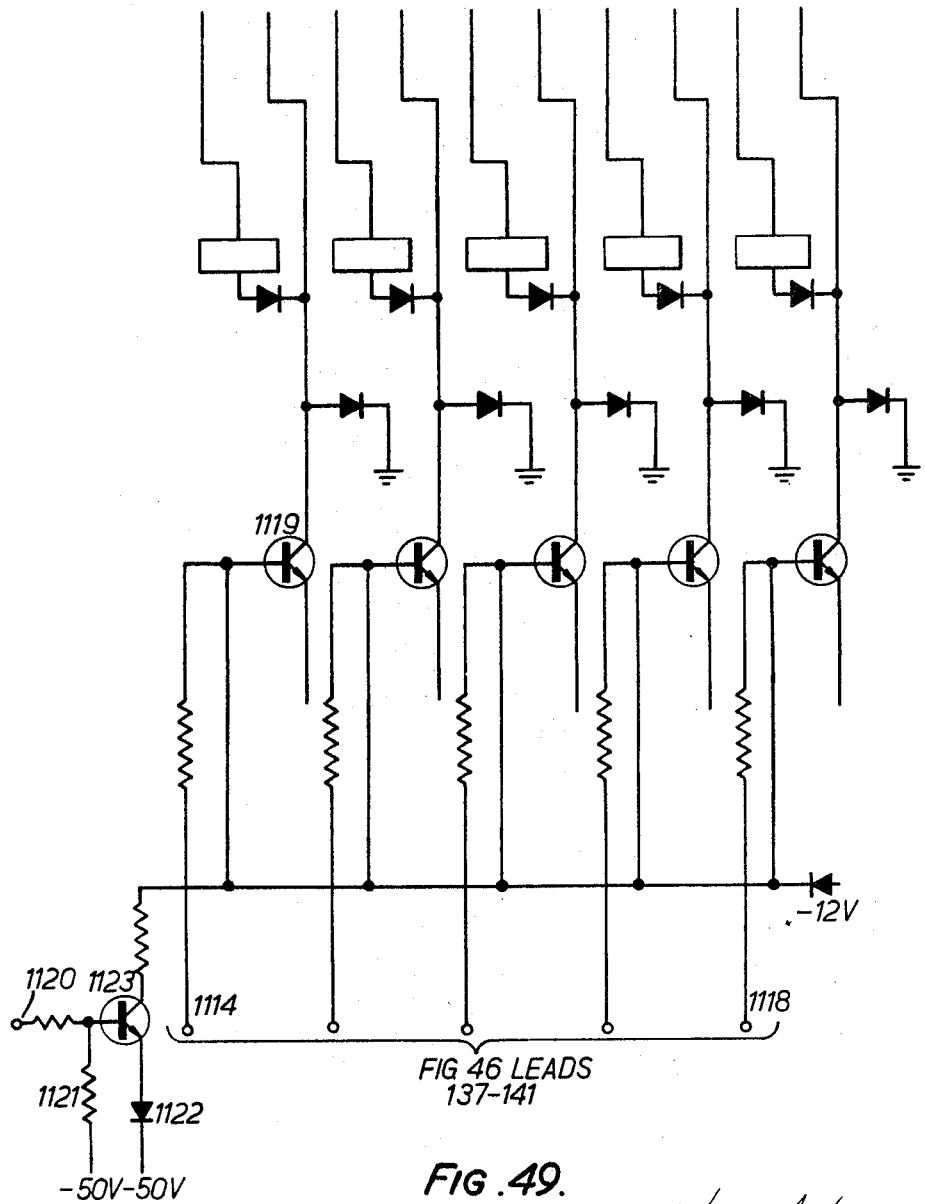

*1 out of 200 Output Circuit Marker—FIGS. 48–50*

A set of leads 1100–1103 FIG. 50, is connected to leads 915–918 FIG. 45. Set of leads 1104–1113 representing digit values 1–0 is connected to leads 534–543 FIG. 35. Set of leads 1114–1118 is connected to leads 137–141 FIG. 46. Having made the previous selections there is one lead marked in each set of leads. The earth on marked lead of set 1114–1118 turns on transistor 1119 FIG. 49, and this together with the mark on one of the leads in the set 1104–1113 causes the associated cross-point relay to operate. For example if leads 1114 and 1104 are marked, then relay RM1 is operated. Operated contact RM1/1 connects lead 1100 FIG. 50 to lead H FIG. 38 of the output circuit 1 of route 1 on the outgoing side of the B switch to which the output is connected. +12 volts on lead 915 FIG. 45 to lead 1100 FIG. 50, operated contact RM1/1 to lead 893 (H) FIG. 38, operating coil 894 of cross-point of B switch to earth via lead 895 and lead 432 FIG. 28. The operated cross-point connects the output circuit through via the AB link to the A switch. +12 volts on the lead H is connected to operating coil 896 of cross-point of A switch, lead 897 connected to lead such as 319 FIG. 21 via operated contact J2 to —12 volts, FIG. 22. The cross-point in A switch is operated and connects the output circuit through to Register Access Unit FIG. 11 to which the calling incoming circuit is connected. Relay K operates to lead H —50 volts connected to operated contact K1 locks relay K and is also applied to lead H to maintain operation of the cross-points in both the A and B switches. The release lead R is marked and via Register Access Switch FIG. 12 to mark lead 61, FIG. 36 to turn on transistors 62 and 63 and operate relays RLA and RLB which lock via contacts RLA1 and RLB1 to lead 64. Contacts RLA3 and RLB3 FIG. 37 connect earth to lead 65. That lead is connected to lead 320 FIG. 17 to lead 557 FIG. 35 to turn on transistor 558 and operate relay RL, to lead 919 FIG. 43, to lead 142 FIG. 46, and to lead 1120, FIG. 49.

Lead 320 releases the Calls Isolator FIGS. 13–29, contacts RL3, RL4 of operated relay RL maintain a —50 volts potential on lead 560 to release relay SR and the detector circuits, FIGS. 30, 31 and 33, 34 in the event that release has not previously taken place due to a free output having been found, lead 919 releases the 1 out of 4 circuit FIGS 43, 44 and 45, and lead 142 the 1 out of 5 circuit FIGS. 46 and 47. Each on lead 1120 FIG. 49 turns on transistor 1123 to release the Output Circuit Marker.

If, within 200 milliseconds of the operation of any one of relays J–U, release as just described has not taken place, forced release is effected by —12 volts potential via the relevant contact of the J–U relay and a lead such as 319, the relevant lead of leads 66–69 and 601–608 for example lead 66, and resistor 609 which turns on transistor 610. Capacitor 615 is charged by the potential across resistor 616 and whilst charging is taking place the normally conducting transistor 613 is turned off. When the capacitor 615 is fully charged transistor 613 is turned on again. Transistor 611 is normally not conducting but when transistor 613 is turned on transistor 611 is turned on because transistor 610 is also conducting. Conducting transistor 611 operates relay FR. Contact FR1 turns on transistor 617 which operates relay FAL which locks to a reset key 618 and contact FAL1. Contact FAL2 applies earth to energise an alarm circuit not shown. Contact FR2 applies earth to lead 65 to effect operation similar to that of relays RLA and RLB under normal release conditions. Contact FAL3 applies +12 volts to lead 61 which results in "parking" of the calling circuit. Contacts RLA2 and RLB2 turn off transistor 617 to leave relay FAL under the sole control of reset key 618.

I claim:

1. A switching stage for a step-by-step communication system comprising a plurality of first rank switches each having a number of inputs, a greater number of outputs and connection means for connecting inputs and outputs, a plurality of second rank switches each having a number of inputs, a number of outputs and connection means for connecting inputs and outputs, the outputs of the first rank switches being distributed amongst and linked to the inputs of the second rank switches, and, associated with the stage a register which is unique to the stage for receiving information relating to a desired connection to be set up from an input of a first rank switch of the stage to an output of a second rank switch of the stage, and, a switching stage control circuit connected to the register for operating the connection means of the switches of the stage to set up the desired connection.

2. A switching stage as claimed in claim 1 in which the number of second rank switches is equal to the number of outputs per first rank switch and in which each output from a first rank switch is linked to a different input of a different second rank switch.

3. A switching stage as claimed in claim 2 in which the number $n$ of inputs per first or second rank switch and the number $m$ of outputs per first or second rank switch are related by the equation $n = m + 1 - x$ where $x$ is the power to which $b$ must be raised to equal the blocking factor of the stage and where $b$ is the mean occupancy of the outputs of the first or second rank switches.

4. A switching stage as claimed in claim 3 in which there are eight first rank switches each with twelve inputs and twenty outputs and twenty second rank switches each with eight inputs and ten outputs.

5. A switching stage as claimed in claim 4 in which the outputs of the second rank switches are grouped together, each group containing one output from each second rank switch.

6. A switching stage as claimed in claim 5 in which the outputs of each second rank switch are similarly numbered and in which each group comprises the same numbered outputs.

7. A switching stage as claimed in claim 6 in which the inputs to the first rank switches comprise communication paths each joined to a first rank switch via a register access unit unique to the path and adapted to extend that path to the register and to provide additionally from the unit to the first rank switch a connection holding path and a signalling path unique to the communication path.

8. A switching stage as claimed in claim 7 in which the second rank switch outputs and the links between the first rank switch outputs and the second rank switch inputs all provide a communication path, a connection holding path and a signalling path.

9. A switching stage as claimed in claim 8 in which the switching stage control circuit includes a call isolator to which is indicated all first rank input circuits from which connections are to be set up and which operates to select one of those circuits, to isolate it for the purpose of setting up the desired connection and to select and mark connection means to which the selected circuit is connected in the first rank switch and connection means in the second rank switches, being the connection means of those second rank switch inputs which are linked to the outputs of the said first rank switch.

10. A switching stage as claimed in claim 9 in which the switching stage control circuit also comprises means for indicating all outputs not in use from the said first rank switch and all free outputs in the group of outputs to which connection is to be set up and for selecting one free output from the said first rank switch connected to an input of a second rank switch having a free output in the group of outputs.

11. A switching stage as claimed in claim 10 in which the register is connected to a marker adapted to apply a marking condition to the holding lead of one of the second rank switch outputs in dependence on information supplied to the register relating to the desired connection.

12. A switching stage as claimed in claim 11 in which the marking condition is transmitted from a second rank switch output along the holding path of that output to operate the marked connection means of that one of the second rank switches to which the marked output is connected and thence along the holding path forming part of the link between that one marked second rank switch to operate the marked connection means of said first rank switch and thence to the register access unit of the selected input.

13. A switching stage as claimed in claim 10 in which the means for indicating all outputs not in use from a first rank switch includes a circuit for applying an interrogating potential to the signalling paths of the links emanating from the outputs of the first rank switch, means responsive to that interrogating potential for identifying links not in use, and in which free outputs are indicated by a further potential applying circuit which applies an interrogating potential to the signalling paths of the outputs in the group of outputs to which connection is desired to operate potential responsive means for identifying outputs not in use.

14. A switching stage as claimed in claim 13 in which the potential responsive means are connected to a comparison circuit which identifies all links connected to second rank switches having free outputs in the group of outputs to which connection is to be set up to a selector which selects one such link and indicates to the marker the second rank switch to which the selected link is connected.

15. A switching stage as claimed in claim 12 in which the marking condition operates, in the register access unit of the selected input, means for maintaining a marking condition on the holding path and release control means for removing the previously applied marking condition.

References Cited
UNITED STATES PATENTS 2,999,131    9/1961    Edstrom     179—18.7
3,129,293    4/1964    Warman     179—22

KATHLEEN H. CLAFFY, *Primary Examiner.*

L. A. WRIGHT, *Assistant Examiner.*